(12) United States Patent
Lipson et al.

(10) Patent No.: US 7,751,654 B2
(45) Date of Patent: Jul. 6, 2010

(54) ELECTRO-OPTIC MODULATION

(75) Inventors: Michal Lipson, Ithaca, NY (US);
Bradley Schmidt, Ithaca, NY (US);
Sameer Pradhan, Portland, OR (US);
Qianfan Xu, Ithaca, NY (US)

(73) Assignee: Cornell Research Foundation, Inc., Ithaca, NY (US)

( * ) Notice: Subject to any disclaimer, the term of this patent is extended or adjusted under 35 U.S.C. 154(b) by 500 days.

(21) Appl. No.: 11/367,756

(22) Filed: Mar. 3, 2006

(65) Prior Publication Data

US 2006/0215949 A1 Sep. 28, 2006

Related U.S. Application Data

(60) Provisional application No. 60/658,536, filed on Mar. 4, 2005.

(51) Int. Cl.
*G02F 1/01* (2006.01)
*G02F 1/035* (2006.01)
(52) U.S. Cl. .................................... 385/1; 385/2; 385/3
(58) Field of Classification Search ........................ 385/1
See application file for complete search history.

(56) References Cited

U.S. PATENT DOCUMENTS

| | | | | |
|---|---|---|---|---|
| 4,002,997 | A * | 1/1977 | Thompson | 372/50.123 |
| 4,877,299 | A | 10/1989 | Lorenzo et al. | |
| 6,522,794 | B1 * | 2/2003 | Bischel et al. | 385/4 |
| 6,845,198 | B2 | 1/2005 | Montgomery et al. | |
| 7,016,554 | B2 * | 3/2006 | Mitchell et al. | 385/1 |
| 2003/0068132 | A1 | 4/2003 | Gunn, III | |
| 2004/0155252 | A1 | 8/2004 | Yap | |
| 2004/0170351 | A1 * | 9/2004 | Fishman et al. | 385/3 |
| 2006/0008223 | A1 | 1/2006 | Gunn, III et al. | |

FOREIGN PATENT DOCUMENTS

WO   WO-2007/086888 A2   8/2007

OTHER PUBLICATIONS

"FullWAVE Version 2.0e—Full-Vectorial Time-Domain Analysis of Photonlc Devices", http://web.archive.org/web/20050205111121/http://www.rsoftinc.com/fullwave.htm, (archived Feb. 5, 2005), 2 pgs.

Almeida, V. R., "Nanotaper for Compact Mode Conversion", *Optics Letters*, 28(15), (2003), 1302-1304.

Barrios, C. A., et al., "Electrooptic Modulation of Silicon-on-Insulator Submicrometer-Size Waveguide Devices", *Journal of Lightwave Technology*, 21(10), (Oct. 2003), 2332-2339.

(Continued)

*Primary Examiner*—Frank G Font
*Assistant Examiner*—Mary A El Shammaa
(74) *Attorney, Agent, or Firm*—Schwegman, Lundberg & Woessner P.A.

(57) ABSTRACT

A silicon electro-optic waveguide modulator is formed using a metal-oxide-semiconductor (MOS) configuration. Various embodiments are described using different modes of operation of the MOS diode and gate oxide thicknesses. In one example, a high-speed submicron waveguide active device is formed using silicon-on-insulator. A micro-ring resonator intensity-modulator exhibits switching times on the order of tens of pS with modulation depth of 73% with a bias voltage of 5 volts.

14 Claims, 17 Drawing Sheets

OTHER PUBLICATIONS

Barrios, C. A., "Low-Power-Consumption Short-Length and High-Modulation-Depth Silicon Electrooptic Modulator", *Journal of Lightwave Technology*. 21(4), (2003),1089-1098.

Cocorullo, G., et al., "Silicon Thermooptical Micromodulator With 700-kHz—3-dB Bandwidth" *IEEE Photonics Technology Letters*, 7(4), (Apr. 1995), 363-365.

Coppola, G., et al., "Simulation and Analysis of a High-Efficiency Silicon Optoelectronic Modulator Based on a Bragg Mirror", *Optical Engineering*, 40(6), Jun. 2001), 1076-1081.

Cutolo, A., et al., "An Electrically Controlled Bragg Reflector Integrated in a Rib Silicon on Insulator Waveguide", *Applied Physics Letters*, 71(2), (Jul. 1997), 199-201.

Cutolo, A., et al., "Silicon Electro-Optic Modulator Based on a Three Terminal Device Integrated in a Low-Loss Single-Mode SOI Waveguide", *Journal of Lightwave Technology*, 15(3), Mar. 1997, 505-518.

Dainesi, P., et al., "CMOS Compatible Fully Integrated Mach-Zehnder Interferometer in SOI Technology", *IEEE Photonics Technology Letters*, 12(6) (Jun. 2000), 660-662.

Giguere, S. R., et al., "Stimulation Studies of Silicon Electro-Optic Waveguide Devices", *Journal of Applied Physics*, 58(10), (1990), 4964-4970.

Hewitt, P. D., et al., "Improved Modulation Performance of a Silicon p-i-n. Device by Trench Isolation", *Journal of Lightwave Technology*, 19(3), (Mar. 2001), 387-390.

Hewitt, P. D., et al., "Improving the Response of Optical Phase Modulators in SOI by Computer Simulation", *Journal of Lightwave Technology*, 18(3), (Mar. 2000), 443-450.

Irace, A., et al., "Fast Silicon-on-Silicon Optoelectronic Router Based on a BMFET Device", *IEEE Journal of Selected Topics in Quantum Electronics*, 6(1), (Jan./Feb. 2000), 14-18.

Kimmerling, L. C., "Photons to the Rescue: Microelectronics Becomes Microphotonics", *Interface*, (Summer, 2000), 28-31.

Lee, K. K., "Transmission and Routing of Optical Signals in On-Chip Waveguides for Silicon Microphtonics", *Thesis, Massachusetts Institute of Technology*, https://dspace.mit.edu/bitstream/1721.1/8768/1/48124503.pdf, (Feb. 2001), 143 pages.

Little, B. E., et al., "Ultra-Compact Si-$SiO_2$ Microring Resonator Optical Channel Dropping Filters", *IEEE Photonics Technology Letters*, 18(4), (Apr. 1998), 549-551.

Liu, A., et al., "A High-Speed Silicon Optical Modulator Based on a Metal-Oxide-Semiconductor Capacitor", *Nature* 427, (2004),615-618.

Png, C. E., et al., "Development of Small Silicon Modulators in Silicon-On-Insulator (SOI)", *Proceedings of SPIE—Photonics Packaging and Integration III*, vol. 497, (2003), 190-197.

Soref, R. A., et al., "Electro-Optical Modulation in $Si_{1-x}Ge_x$/Si and Related Heterostructures", *International Journal of Optoelectronlcs*, 9(2), (1994), 205-210.

Soref, R. A., et al., "Electrooptical Effects in Silicon", *IEEE Journal of Quantum Electronics*, vol. QE-23(1), (Jan. 1987),123-129.

Soref, R. A., et al., "Kramers-Koenig Analysis of E-O Switching in Silicon", *SPIE Integrated Optical Circuit Engineering IV*, vol. 704, (1986),32-37.

Van Zeghbroeck, B. V., *Principles of Semiconductor Devices*, http://web.archive.org/web/20050207053745/http://ece-www.colorado.edu/~bart/book/, (archived Feb. 7, 2005), 1 pg.

Verdeyen, J. T., *Laser Electronics*, 2nd Edition, Prentice-Hall, Englewood, Cliffs, NJ,(1989), 137-139.

Zhao, C. Z., et al., "Zero-Gap Directional Coupler Switch Integrated Into a Silicon-on Insulator for 1.3-um Operation", *Optics Letters*, 21(20), (Oct. 15, 1996), 1664-1666.

International Search Report in corresponding PCT Application No. PCT/US2006/007647, (Jul. 23, 2007), 5 pgs.

Written Opinion in corresponding PCT Application No. PCT/US2006/007647, (Jul. 23, 2007), 8 pgs.

Barrios, C. A., et al., "3C-SiC Modulator for High-Speed Integrated Photonics", *Materials Research Society Symposium Proceedings*, vol. 799—*Progress in Compound Semiconductor Materials III—Electronic and Optoelectronic Applications*, (2004), 223-227.

Barrios, C. A., et al., "Modeling and Analysis of High-Speed Electro-Optic Modulation in High Confinement Silicon Waveguides Using Metal-Oxide-Semiconductor Configuration", *Journal of Applied Physics*, 96(11), (Dec. 2004), 6008-6015.

Grover, R., "Chapter 7—A Tunable Micro-Ring Notch Filter", *Indium Phosphide Based Optical Micro-Ring Resonators, Dissertation, Graduate School of the University of Maryland*, [online]. [retrieved on Jul. 10, 2007]. Retrieved from the Internet: <URL: https://drum.umd.edu/dspace/handle/1903/261?mode=full>, (2003), 123-147.

Lipson, M., "Switching and Modulating Light on Silicon", *Optoelectronic Integration on Silicon II*, 5730(1), (Jan. 2005), 102-113.

Sadagopan, T., et al., "Carrier-Induced Refractive Index Changes in InP-Based Circular Microresonators for Low-Voltage High-Speed Modulation", *IEEE Photonics Technology Letters*, 17(2), (2005), 414-416.

Sadagopan, T., et al., "High-Speed, Low-Voltage Modulation in Circular WGM Microresonators", *2004 Digest of the LEOS Summer Topical Meetings—Biophotonics/Optical Interconnects and VLSI Photonics/WBM Microcavities*, (2004), 7-8.

Xu, Q., et al., "Micrometre-Scale Silicon Electro-Optic Modulator", *Nature* 435(7040), (2005), 325-327

\* cited by examiner

ELECTRO-OPTIC MODULATION

RELATED APPLICATIONS

This application claims priority to United States Provisional Application Ser. No. 60/658,536 (entitled Electro-Optic Modulation, filed Mar. 4, 2005) which is incorporated herein by reference.

GOVERNMENT FUNDING

The invention described herein was made with U.S. Government support under Contract No. ECS-0300387 awarded by National Science Foundation (NSF), under contract 2003-IT-674 awarded by DARPA, and under Grant No. ECS-9731293 awarded by the National Science Foundation. Further support was provided under grant No. F49620-03-1-0424 from AFOSR (Dr. Gernot Pomrenke). The United States Government has certain rights in the invention.

BACKGROUND

Metal interconnections are expected to become a bottleneck of performance of electronic systems as transistors continue to scale to smaller sizes. Optical interconnections, implemented at different levels ranging from rack-to-rack down to chip-to-chip and intra-chip interconnections could enable low power dissipation, low latencies and high bandwidths. The realization of such small scale optical interconnections relies on the ability to integrate micro-optical devices with the microelectronics chip. The recent demonstrations of silicon low-loss waveguides, amplifiers and lasers advance this integrative goal, but a silicon electro-optic modulator with a size small enough for chip-scale integration is needed.

SUMMARY

A high-speed electro-optical modulator is formed in highly compact structures. The modulator is based on a light-confining structure that enhances the sensitivity of light to small changes in refractive index and also enables high speed operation.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description is, therefore, not to be taken in a limited sense, and the scope of the present invention is defined by the appended claims.

Sections of the following text describe different example embodiments of the invention. A first section describes an ultra-compact silicon electro-optic modulator. A second section describes high speed electro-optic modulation in high confinement silicon waveguides using metal-oxide-semiconductor (MOS) configurations. A third section provides a description of MOS geometries for integrating MOS and p-i-n structures.

Ultra-Compact Silicon Electro-Optic Modulator

Electro-optical control of light on silicon is challenging due to its weak electro-optical properties. The large dimensions of previously demonstrated structures were necessary in order to achieve a significant modulation of the transmission in spite of the small change of refractive index of silicon.

Light confining resonating structures can enhance the effect of refractive index change on the transmission response. Ring resonators have been used for all-optical modulation. The optical properties of one device was changed by using one beam of light to optically injecting free carriers and therefore control the flow of another beam of light. A doped ring resonator may have intrinsic carriers, which can be modulated by application of reverse bias voltages, affecting the flow of light.

Figure 1:
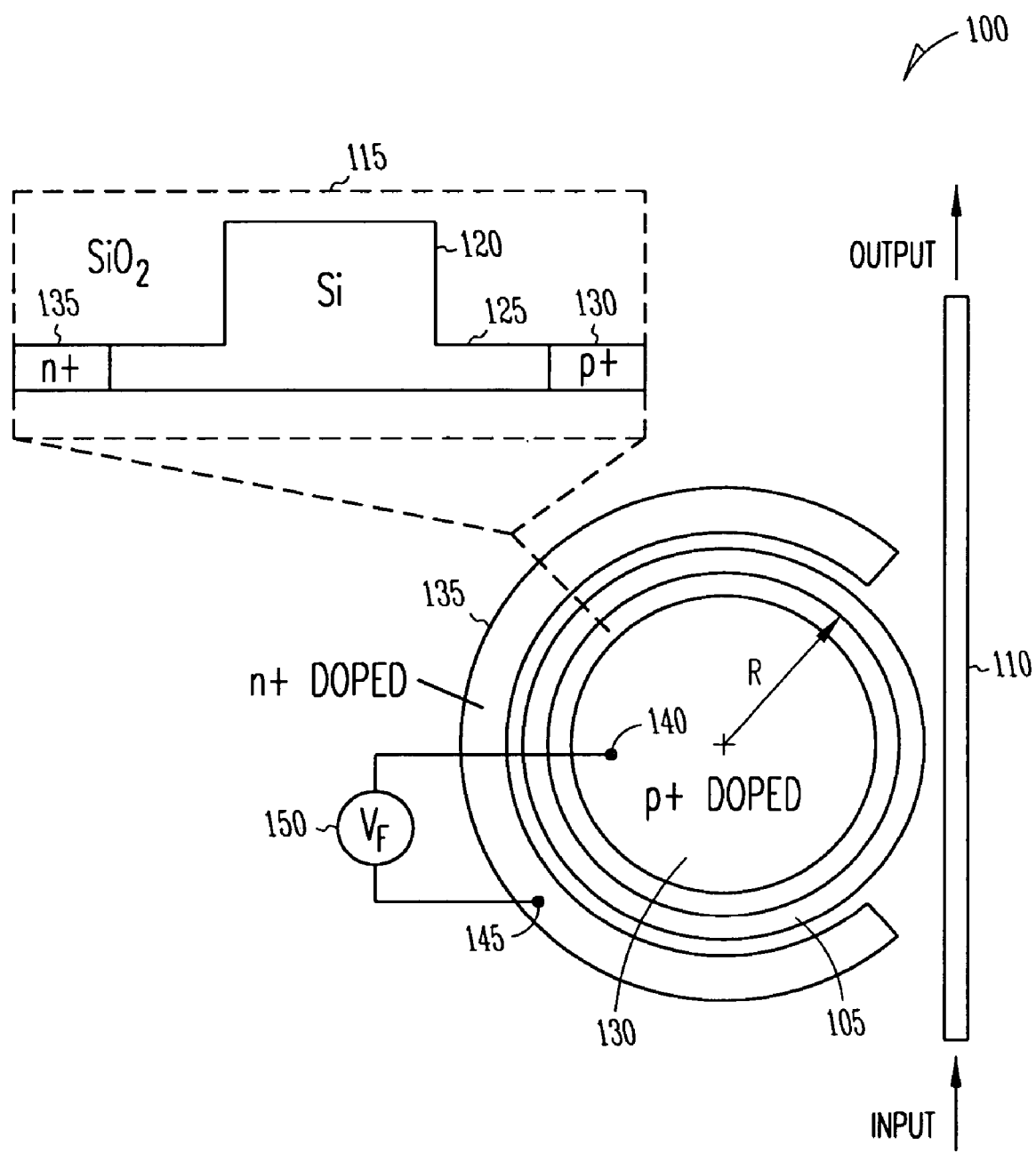
FIG. 1 is a layout schematic of a ring resonator based modulator with an inset showing a schematic of the cross-section of the ring according to an example embodiment.

A schematic of an example electro-optic modulator is shown in FIG. 1 generally at 100. The modulator 100 consists of a ring resonator 105 coupled to a single waveguide 110. The transmission of a ring resonator, coupled to a waveguide, is highly sensitive to the signal wavelength and is greatly reduced at wavelengths in which the ring circumference corresponds to an integer number of guided wavelengths. By tuning the effective index of the ring waveguide 105, the resonance wavelength is modified which induces a strong modulation of the transmitted signal.

Figure 2A:
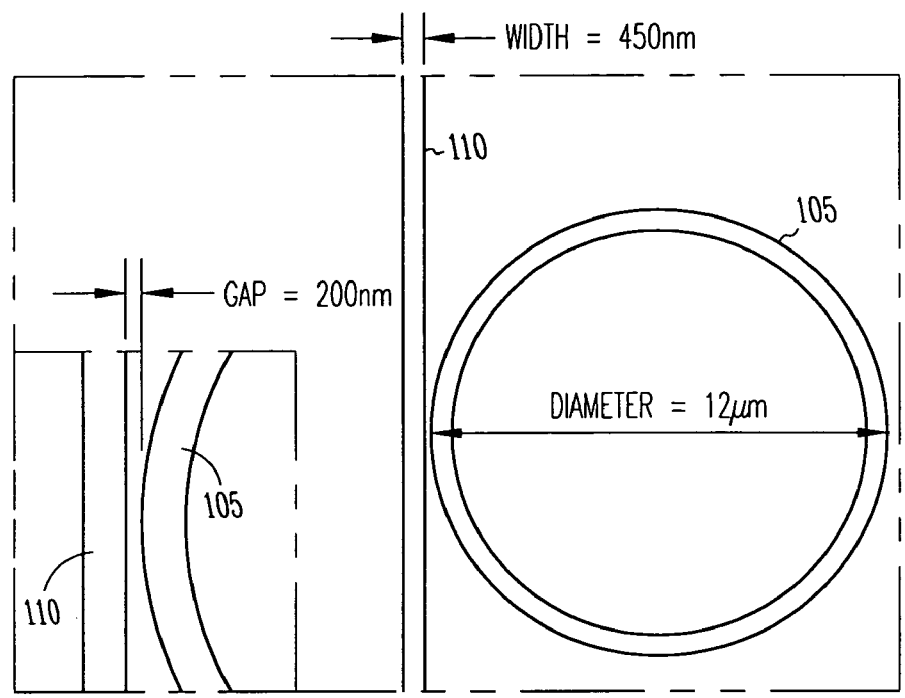
FIGS. 2A and 2B are a top-view SEM picture of the ring coupled to the waveguide with a zoom-in picture of the coupling region, and a top-view microscopic picture of the ring resonator after the metal contacts are formed according to an example embodiment.
Figure 2B:
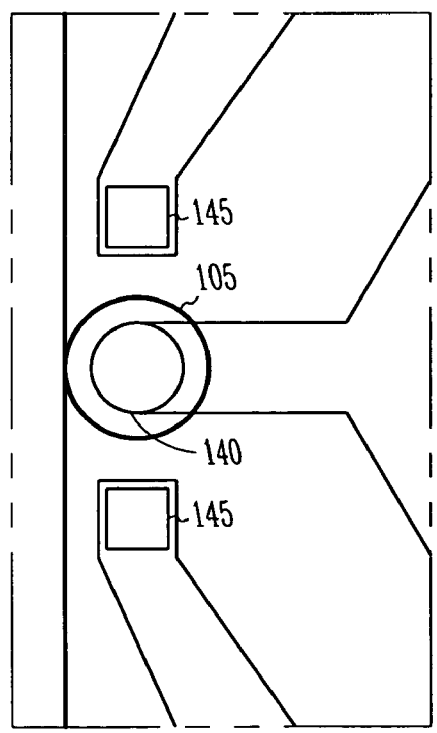

The effective index of the ring is modulated electrically by carrier injection using a p-i-n junction 115 in the inset, embedded in the waveguide forming the ring resonator. The inset of FIG. 1 shows the cross-section of this waveguide. It consists of a strip waveguide 120 formed on a thin 50-nm thin slab layer 125. Since the thickness of the slab is much smaller than the wavelength propagating in the device (1.5 μm), the mode profile of this waveguide is very close to that of a SOI strip waveguide. Highly doped p and n regions are defined around the ring using ion implantation as indicated at 130 and 135 respectively. Ohmic contacts are deposited on the doped regions at 140 and 145. In order to minimize absorption losses, the doped regions are formed approximately 1 μm away from the ring resonator, ensuring that the overlap of the resonating mode with the doped regions is minimal. A voltage source 150 is coupled to the ohmic contacts to tune the effective index of the ring waveguide 105 and thus modulate light transmission. A scanning electron microscope image of an example modulator is shown in FIGS. 2A and 2B, wherein the numbering is similar to that in FIG. 1.

In one embodiment, the p-i-n ring resonator is formed on a SOI substrate with 3-μm buried oxide layer. Both the waveguide coupling to the ring and the one forming the ring have width of 450 nm and height of 250 nm. The diameter of the ring is approximately 12 μm, and the spacing between the ring and the straight waveguide is 275 nm. In order to ensure high coupling efficiency between the waveguide and the incoming optical fiber, nanotapers may be fabricated at the ends of the waveguide. A nanotaper is basically a narrowing of the waveguide to one or more nanometer size ends, which may be optically efficiently coupled to an optical fiber or larger waveguide structure. The structures may be defined using lithography followed by reactive ion plasma etching (RIE). After etching of the ring resonator structure, doping regions may be defined using photolithography, and doping may be accomplished by ion implantation. After ion implantation, a 1-μm thick silicon oxide layer may be deposited onto the wafer using plasma enhanced chemical vapor deposition. Vias are then opened into the oxide using photolithography and plasma etching for depositing the metal contacts. Dimensions referred to in these embodiments may be varied significantly, such as to obtain structures that resonate at different frequencies. Process steps may also be performed in different ways, and are described simply to illustrate one example method of fabricating the structures. In various embodiments, the radius of the ring may vary between approximately 1 and a few hundred microns.

Figure 3:
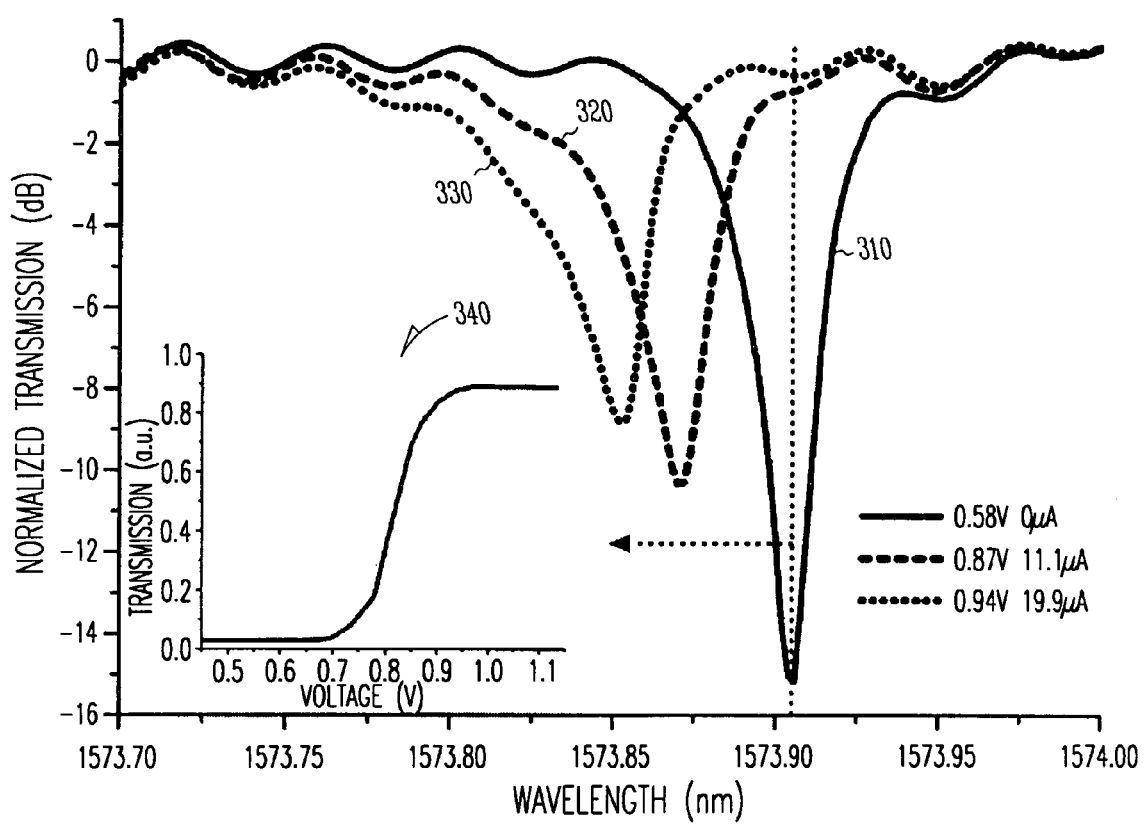
FIG. 3 is a graph of a transmission spectrum of the ring resonator at the bias voltage of 0.58 V, 0.87 V, and 0.94 V, respectively with an inset showing a transfer function of the modulator for light with wavelength of 1573.9 nm according to an example embodiment.

FIG. 3 shows the relative transmission through the modulator around the resonance of 1574 nm at different bias of the p-i-n junction. The solid curve 310 shows the spectrum when the p-i-n junction is biased below threshold of the diode, and the current through the junction is below one detection limit (0.1 μA). The spectrum shows a 15-dB drop of transmission at the resonant wavelength of 1574.9 nm. The 3-dB bandwidth of the resonance $\Delta\lambda$ is 0.04 nm measured from the spectrum, corresponding to a quality-factor, defined as Q=$\lambda/\Delta\lambda$, of 39350. This Q factor correspond to cavity photon lifetimes of $\tau_{cav1}$=$\lambda^2/(2\pi c\Delta\lambda_{FWHM1})$=33 ps, where c is the speed of light in vacuum. Thus, despite the resonant nature of the structure, the photon confinement of modulator does not limit its speed. The small ripples (~1 dB) on the waveform originate from the reflections at both ends of the waveguide, which can be eliminated by anti-reflection coating. The carrier density in the cavity increases as the forward bias on the p-i-n junction increases. The dashed and dotted curves 320, and 330 in FIG. 3 show the spectra when the bias voltage is 0.87 V and 0.94 V, and the current is 11.1 μA and 19.9 μA, respectively. In both cases the resonance is blue shifted due to the lowering of effective index caused by the increase of carrier density. The depths of the notches in the spectra also decrease, due to the increased absorption loss in the ring induced by the injected carriers. Comparing the curves in FIG. 3, one can see that at the wavelength of 1573.9 nm, 97% modulation can be obtained with less than 0.3 V bias voltage change. At this wavelength, since light does not couple to the ring when the free carriers are generated, the absorption of free carriers does not cause any extra loss to the light.

The light confining nature of the modulator not only enables shrinking of the device size, but also enables high speed operation under p-i-n configuration. The p-i-n configuration of the modulator, as opposed to the MOS configuration, is important for achieving high modulation depth, since the overlap between the region where the index is changed and the waveguide mode index changes is large. However, p-i-n devices have been traditionally considered as relatively slow devices when compared to MOS ones. In these devices, while extraction of carriers in reverse biased operation can be fast, down to tens of ps, carriers injection in forward bias operation is slow, limited by the rise time of the p-i-n, on the order of 10 ns. The resonating nature of the modulator removes this speed limitation. The inset 340 of FIG. 3 shows the transfer function of the device, i.e., the transmission of the modulator at the wavelength of 1573.9 nm with different bias voltages. This transfer function shows that the resonating nature of the device enables voltages larger that 0.9V to be applied without modifying the transmission response (T~1). This is because at these voltages the resonance of the device is completely detuned from the probe wavelength. This insensitivity of the optical transmission at higher bias voltage is in strong contrast to Mach Zender modulators, in which higher voltage affect strongly the transmission. When the device is operation at higher voltages, the optical transmission goes to ~1 well before the PIN junction reaches its steady state. This means that the optical rise time can be far less than the electrical rise time of ~10 ns at high forward biasing, which is crucial for achieving high speed modulation.

Figure 4A:
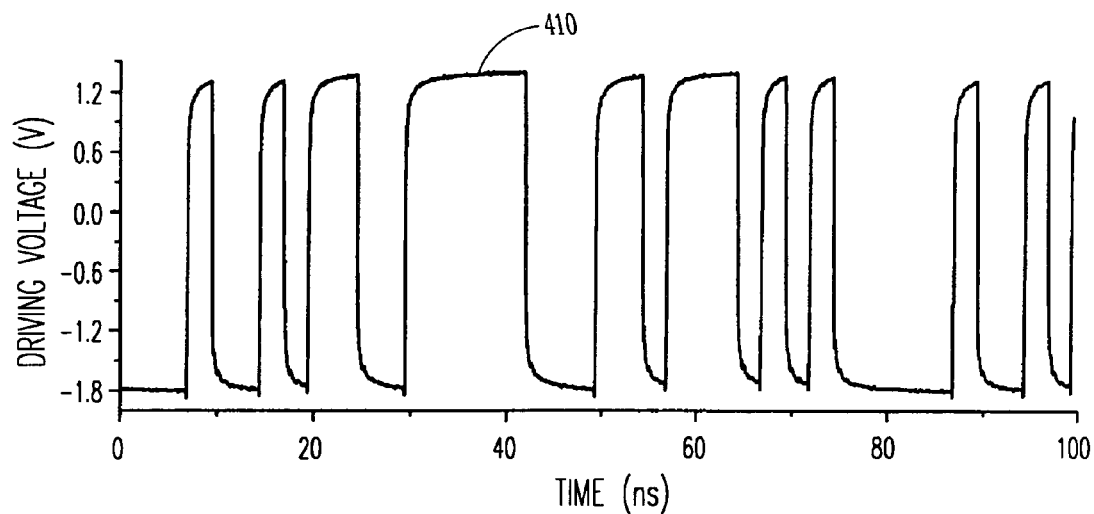
FIGS. 4A and 4B are waveforms of a driving voltage an output optical power when a ring resonator based modulator is driven by 32-bit random data sequences at the data rate of 400 Mbps according to an example embodiment.
Figure 4B:
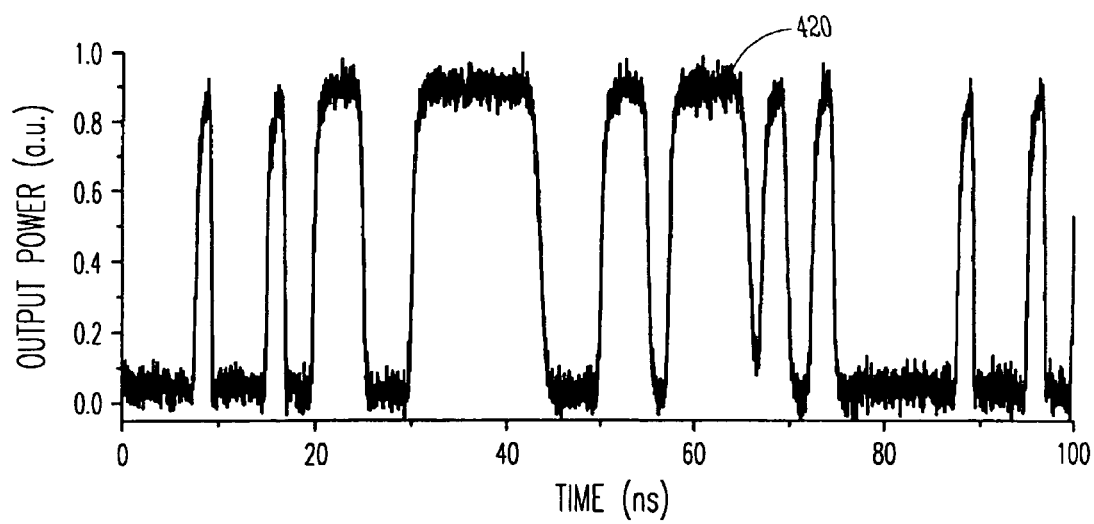

In order to measure the dynamic response of the modulator, a 0.4 Gbit/s electrical signal generated by a pulsed pattern generator is used to drive the modulator. The peak-to-peak voltage (Vpp) of the signal is 3.3 V. The output the waveguide is sent to a 12-GHz detector and the waveform is recorded on an oscilloscope. FIGS. 4A and 4B show both the driving data pattern 410 and the optical output 420, demonstrating high modulation depths at 0.4 Gb/sec. On FIG. 4B an approximately 1.2 ns optical rise time is shown. Reducing the contact resistance, currently measured to be about 4 kΩ in one example device, to a typical value of 100 ohm would reduce the rise time to less than 0.1 nsec for the same applied voltage, enabling its operation at speeds higher than 5 Gbps at ~3 Vpp.

The wavelength selective modulation property of the modulator can be utilized for building wavelength division multiplexing (WDM) interconnections, which can greatly extend the bandwidth of optical interconnections. Given the short length of the modulator (<20 μm) and the waveguide propagation loss of approximately 4+/−1 dB/cm, the insertion loss of the modulator itself is negligibly to light with wavelength detuned from the ring resonance. The small insertion loss of the modulator makes it possible to cascade multiple modulators along a single waveguide and modulate independently each WDM channel.

High-Speed Electro-Optic Modulation in High Confinement Silicon Waveguides using Metal-Oxide-Semiconductor Configurations.

Figure 5A:
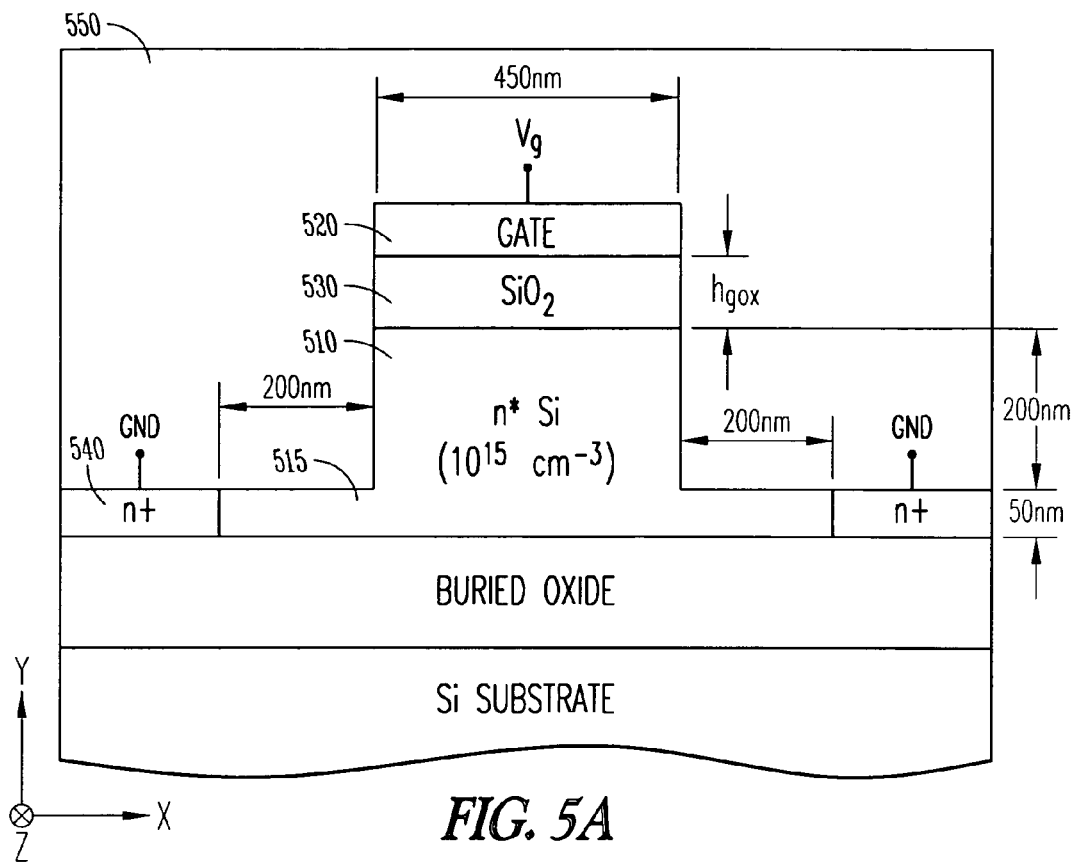
FIGS. 5A, 5B and 5C are schematic cross-sections of MOS high-index-contrast SOI rib waveguides for 1.55-μm wavelength with three doping schemes are shown: A) for inversion, B) for accumulation and C) for depletion operation according to example embodiments.
Figure 5B:
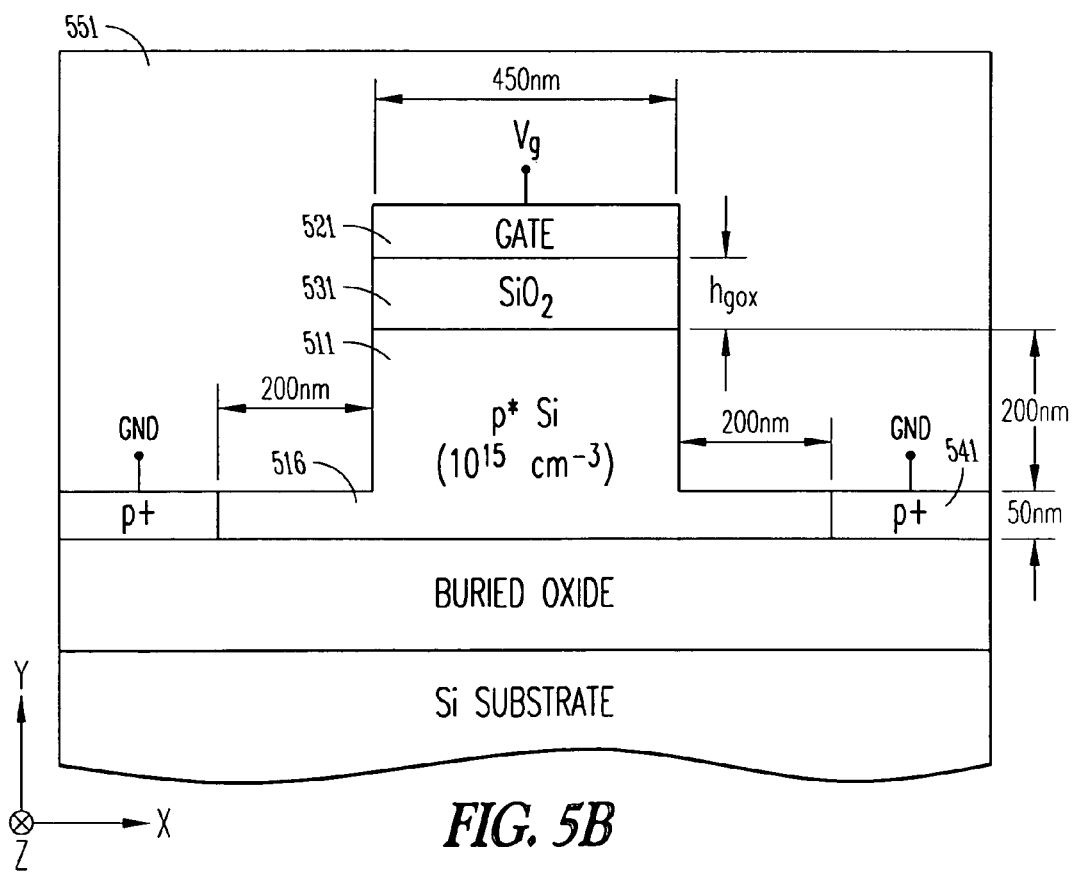
Figure 5C:
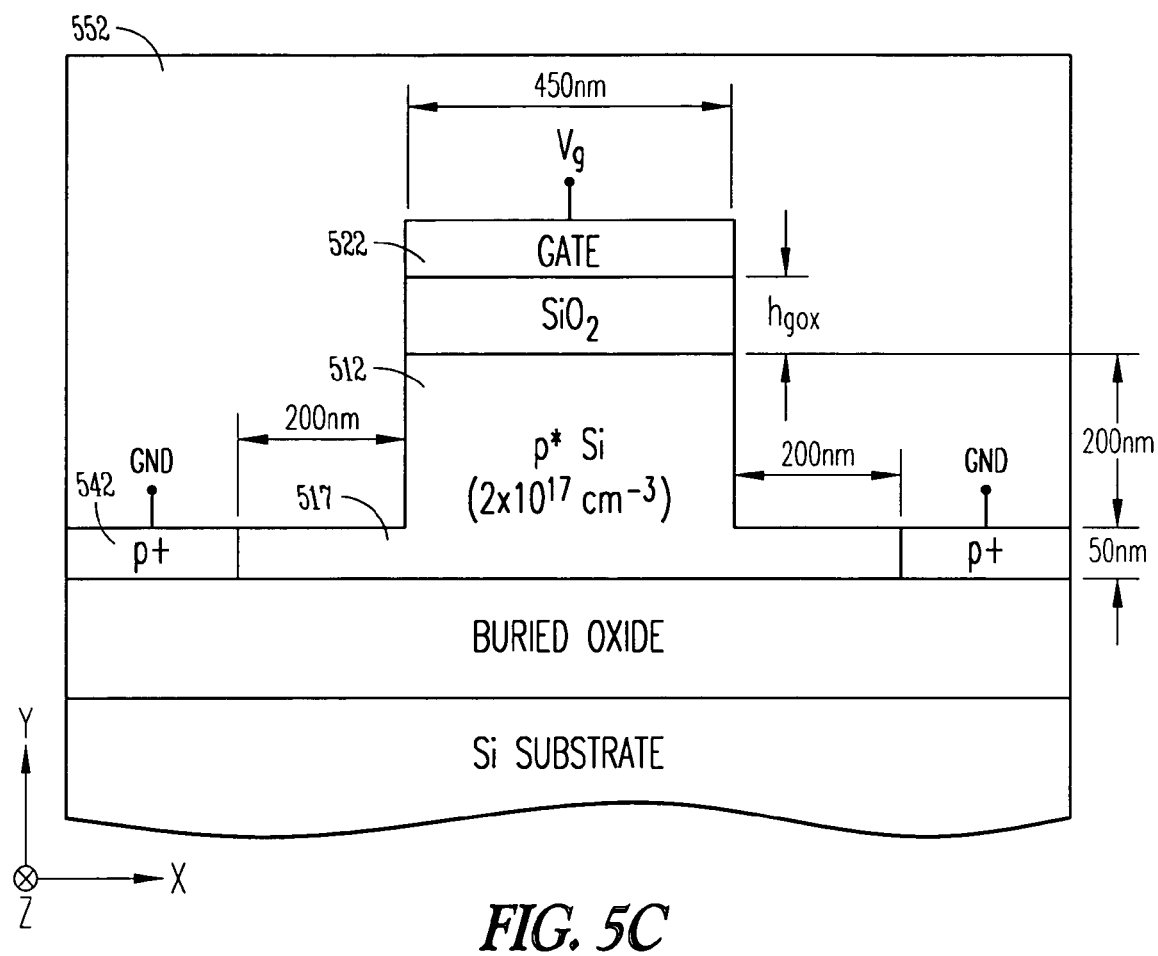

The electrical and optical properties of a silicon electro-optic waveguide modulator using a metal-oxide-semiconductor (MOS) configuration are described. Device performance may be observed under different modes of operation of a MOS diode and gate oxide thicknesses as illustrated in FIGS. 5A, 5B and 5C. Calculations indicate that these embodiments may be used for achieving high-speed submicron waveguide active devices on silicon-on-insulator. A microring resonator intensity-modulator is predicted to exhibit switching times on the order of tens of ps with modulation depth of 73% by employing a bias voltage of only 5 V. In a further embodiment, a submicron-size one-dimensional microcavity intensity-modulator is predicted to exhibit switching times on the order of tens of ps with modulation depth of 19% by employing a bias voltage of only 5 V.

The main methods to alter the refractive index in Si are the thermo-optic effect and the plasma dispersion effect. The thermo-optic effect is rather slow and can be used only up to 1 MHz modulation frequency. For higher speed, electro-optic devices are required. Unstrained pure crystalline Si does not exhibit linear electro-optic (Pockels) effect and the refractive index changes due to the Franz-Keldysh effect and Kerr effect are very weak. Therefore, the free carrier dispersion effect is used to change electrically both the real refractive index and optical absorption coefficient. In a further embodiment, the resonator structure may be doped, creating intrinsic carriers. These carriers may also be modulated with a reverse bias voltage to modulate the light.

The free-carrier concentration in Si electro-optic devices can be varied by injection, accumulation, depletion or inversion of carriers. P-i-n diodes and metal-oxide-semiconductor field-effect-transistors (MOSFET) may be employed for this purpose. In a previous work, we proposed and analyzed a waveguide active structure based on a p-i-n diode. That configuration was predicted to provide high modulation depth for very low power consumption. The switching time was calculated to be around 1.29 ns, limited by carrier diffusion (carrier injection process). The use of a MOS diode should lead to higher speed operation since the carrier distribution in the semiconductor is governed by a drift mechanism (electric field). Additional advantages of a MOS configuration are negligible dc power consumption and the fact that the refractive index change is localized under the gate electrode, and therefore no carrier confinement methods (like isolation trenches in a p-i-n diode) are necessary. In a MOS structure however, in carrier depletion, accumulation or inversion configuration, significant large concentration variations are possible only within small distances (a few tens of nanometers) beneath the insulated gate region. This produces a small overlap between the optical mode and the non-equilibrium charge distribution in the waveguide, leading to a smaller effective index variation in a MOS system than that in a p-i-n configuration. A small index change requires a very long structure, on the order of millimeter, in order to induce a significant modulation depth.

In one embodiment of the present invention, a micron-size MOS-based high-index-contrast SOI waveguide provides high-speed electro-optic modulation in Si based on strong light confinement. The light confinement enhances the effect of small index changes on the transmission of the device, enabling an ultra-compact structure with high modulation depth. In one embodiment, a studied high-index-contrast waveguide structure permits, contrary to previous works, negligible losses for a radius of curvature as small as 5 μm, allowing the implementation of high dense photonic circuits. In a further embodiment, a structure studied is based on sub-micron size high index contrast waveguides, enabling contrary to previous works, negligible losses for a radius of curvature as small as 5 μm, allowing the implementation of high dense photonic circuits.

FIGS. 5A, 5B and 5C show schematic cross-sections of various MOS-waveguide configurations. The structures consist of a high aspect ratio [rib height (200 nm)>>slab height (50 nm)] rib SOI waveguide 510, 511 and 512, with highly doped regions ($10^{19}$ cm$^{-3}$) defined in the slab 515, 516, and 517 at each side of the rib. The structures illustrated in FIGS. 5A, 5B and 5C operate under different mechanisms for modulation: carrier inversion (hole inversion layer) in FIG. 5A, hole accumulation in FIG. 5B and hole depletion operation regimes in FIG. 5C, respectively. The inversion and accumulation configurations are based on increasing the hole concentration under the gate 520, 521 oxide 530, 531 whereas the depletion configuration is based on decreasing the hole concentration in the waveguide 512 core.

The silicon layer (device layer) has a background doping concentration of $10^{15}$ cm$^{-3}$ in FIG. 5A (n-type) and 5B (p-type), whereas a uniform doping concentration of p=2×$10^{17}$ cm$^{-3}$ is considered in FIG. 5C. A rib cross section height and width dimension are considered to be the ones typical of a 1.55-μm-wavelength high-index-contrast strip SOI waveguide, that is, 250 nm and 450 nm, respectively, in order to guarantee single mode operation. The distance of the doped regions to the rib sidewalls is 200 nm. In one embodiment, a 100-nm-thick and 450-nm-wide n-type highly-doped ($8\times10^{18}$ cm$^{-3}$) poly-Si layer acts as a gate electrode 520, 521 and 522, whereas the lateral highly doped regions 540, 541, 541 operate as ground (Gnd) electrodes. A top SiO$_2$ cladding layer 550, 551, 552 covers the whole structure. In a further embodiment, a 100-nm-thick and 450-nm-wide metal (Au) layer acts as a gate electrode 520, 521 and 522, whereas the lateral highly doped regions 540, 541 and 542 operate as ground (Gnd) electrodes.

From the values of the electron and hole concentrations at any point of the Si core waveguide (calculated with the electrical model described below), the induced real refractive index and optical absorption coefficient variations (Δn and Δα, respectively) produced by free-carrier dispersion at a wavelength of 1.55 μm are calculated by using:

$$\Delta n = \Delta n_e + \Delta n_h = -[8.8\times10^{-22}\cdot\Delta N + 8.5\times10^{-18}\cdot(\Delta P)^{0.8}] \quad [1]$$

$$\Delta\alpha = \Delta\alpha_e + \Delta\alpha_h = 8.5\times10^{-18}\cdot\Delta N + 6.0\times10^{-18}\cdot\Delta P \quad [2]$$

where $\Delta n_e$ is the refractive index change due to electron concentration change;

$\Delta n_h$ is the refractive index change due to hole concentration change;

$\Delta N$ is the electron concentration change in cm$^{-3}$;

$\Delta P$ is the hole concentration change in cm$^{-3}$;

$\Delta\alpha_e$ (in cm$^{-1}$) is the absorption coefficient variations due to $\Delta N$;

$\Delta\alpha_h$ (in cm$^{-1}$) is the absorption coefficient variation due to $\Delta P$.

Eq. 1 indicates that the effect on the refractive index of holes is approximately three times larger than that due to electrons for the same carrier concentration. Eq. 2 reveals that the contribution to the absorption coefficient due to holes is lower than that due to electrons. These two facts justify the use of the hole distribution to vary the refractive index for all the MOS modes of operation illustrated in FIGS. 5A, 5B and 5C.

A two-dimensional simulation package, ATLAS from SILVACO, may be employed to achieve the electrical calculations. The device modeling software may be used to analyze electro-optic modulators in SOI waveguides. This program simulates internal physics and device characteristics of semiconductor devices by solving Poisson's equation and the charge continuity equations for electrons and holes numerically. The surfaces of the waveguide have been considered oxide-passivated. The main parameters used in the simulations are shown in Table I.

TABLE I

| | |
|---|---|
| Si refractive index, $n_{Si}$, (λ = 1.55 μm) | 3.43 |
| SiO$_2$ refractive index, $n_{SiO}$, (λ = 1.55 μm) | 1.46 |
| Electron carrier lifetime, $\tau_n$, (ns) | 700[a] |
| Hole carrier lifetime, $\tau_p$, (ns) | 300[a] |
| Electron mobility, $\mu_n$, (cm$^2$/Vs) | 1000 |
| Hole mobility, $\mu_h$, (cm$^2$/Vs) | 500 |
| Electron Auger coefficient | $8.3\times10^{-32}$ |
| Hole Auger coefficient | $1.8\times10^{-31}$ |
| Si background carrier conc. (cm$^{-3}$) | $1\times10^{15}$ |
| Au refractive index, $n_{Au}$, (λ = 1.55 μm) | 0.18[b] |
| Au absorption constant, $k_{Au}$, (λ = 1.55 μm) | 10.21[b] |

The following sections discuss the modal and geometry characteristics of the waveguide structure, and the variation of the effective refractive index and optical losses of the configurations illustrated in FIGS. 5A, 5B and 5C for two gate oxide thicknesses, $h_{gox}$=100 nm and $h_{gox}$=200 nm, as a function of the applied bias under steady-state conditions. The dynamic characteristics of the MOS-waveguide under different operation regimes are also discussed.

In one embodiment, all the structures in FIGS. 5A, 5B and 5C exhibit single mode operation for both TE-like and TM-like polarization modes and gate oxide thicknesses $h_{gox}$=100 nm and $h_{gox}$=200 nm. The considered distance of the highly-doped regions to the rib sidewalls (200 nm) and the slab thickness (50 nm) avoid excessive optical losses from the highly-doped regions and enables implementing low-loss bent waveguides with a radius of curvature as small as 5 μm.

Optical coupling from (to) an optical fiber to (from) the considered high-index-contrast rib waveguide can be efficiently achieved by using an inverse nanotaper. Mode delocalization can be used in order to effectively bridge between the mode and index mismatch of index sub-micron size waveguides and large fibers using compact structures.

Figure 6A:
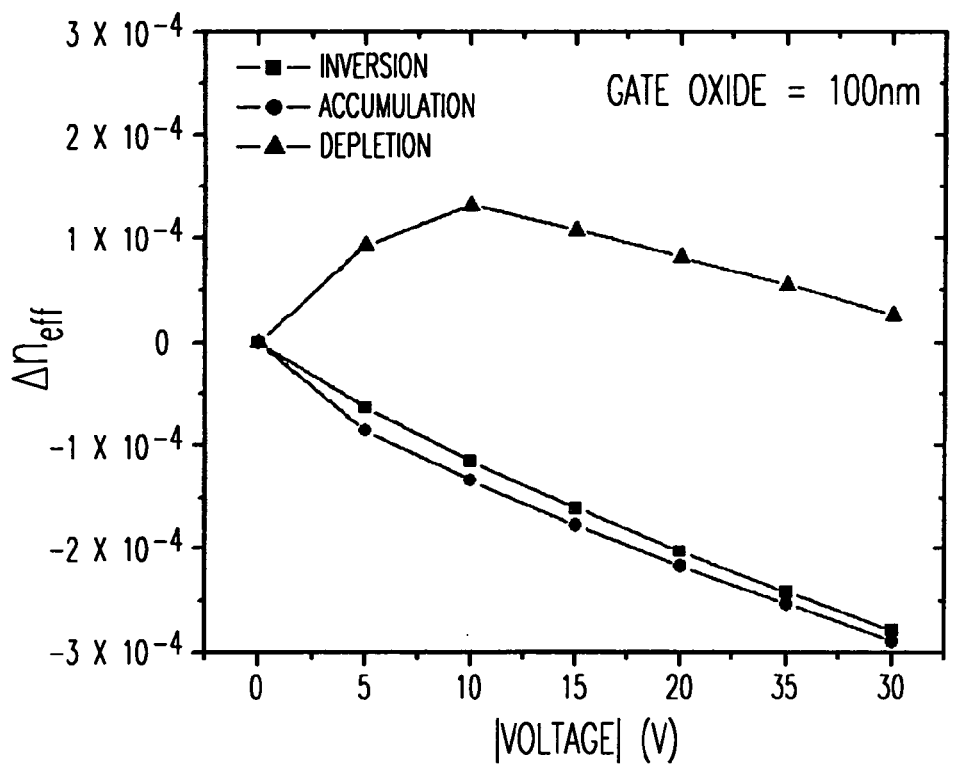
FIGS. 6A and 6B are graphs for first and second embodiments illustrating steady-state effective refractive index variation as a function of the absolute voltage of the gate voltage for inversion (squares), accumulation (circles) and depletion (triangles) operation modes for gate oxide thicknesses of a) $h_{gox}=100$ nm and b) $h_{gox}=200$ nm, where the applied voltage is negative for the inversion and accumulation modes and positive for the depletion mode.
Figure 6B:
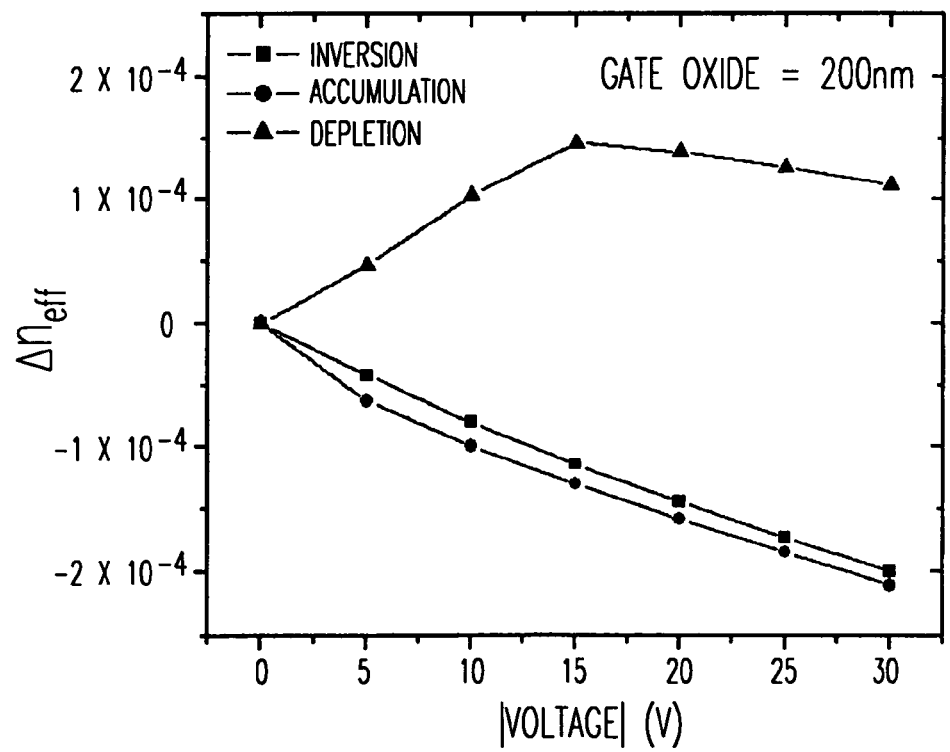

Static characteristics are now discussed. In various embodiments, a highly doped or metal gate electrode region may add significant optical losses if its distance to the Si waveguide ($h_{gox}$) is too short, since it would overlap significantly with the optical mode field. On the other hand, $h_{gox}$ cannot be very long in order to allow for small operation voltages. Therefore, a tradeoff must be found for the value of $h_{gox}$. FIGS. 6A and 6B show the calculated effective refractive index change ($\Delta n_{eff}$) as a function of the absolute value of the gate voltage ($V_g$) for $h_{gox}$=100 nm and $h_{gox}$=200 nm, respectively, for the three MOS operation modes. As expected, higher values of $|\Delta n_{eff}|$ are obtained for $h_{gox}$=100 nm under the same operation mode.

Figure 7:
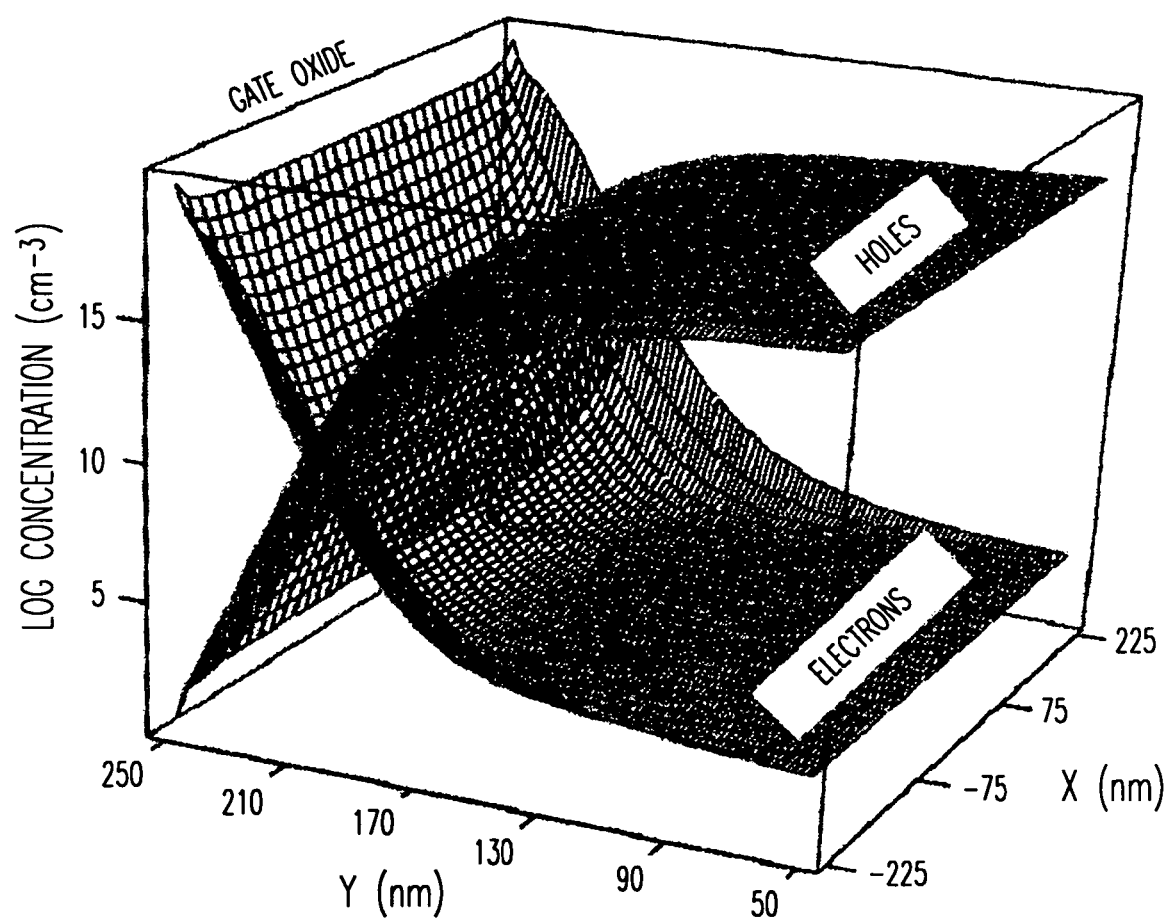
FIG. 7 illustrates steady-state carrier 2-D distribution in an Si core waveguide for the depletion-mode operation with a gate voltage is $V_g=20$ V and $h_{gox}=200$ nm.

The bias-dependencies of the accumulation- and inversion-mode configurations are similar for both values of $h_{gox}$. In both cases, a thin layer of holes is formed beneath the gate oxide. The hole concentration in this layer increases with the absolute value of the gate voltage (negative). The values of $|\Delta n_{eff}|$ are slightly higher for the accumulation mode than for the inversion mode for the same $V_g$, because holes are majority carriers for the former regime and minority carriers in the latter, and therefore, higher hole concentration values are obtained in the former. In both FIGS. 6A and 6B, it is seen for the depletion case that, as the gate voltage increases, $\Delta n_{eff}$ initially increases due to the increase of the depleted layer region; then $\Delta n_{eff}$ reaches a maximum at a certain voltage and it decreases as the gate voltage increases. This is because of the formation of an electron inversion layer beneath the gate oxide when the threshold voltage ($V_t$) of the MOS diode is exceeded (strong inversion condition). For the configuration of FIG. 5C, $V_t$=7.9 V and 14.9 V for $h_{gox}$=100 nm and $h_{gox}$=200 nm, respectively. The increase of carriers (electrons) produces an opposite effect (decrease of $n_{eff}$) as that induced by the depleted region (increase of $n_{eff}$), reducing the total effective index variation. The inversion layer formation is illustrated in FIG. 7, which shows the hole and electron two-dimensional distribution in the Si core waveguide for the device of FIG. 5C, $V_g$=20 V and $h_{gox}$=200 nm.

Figure 8:
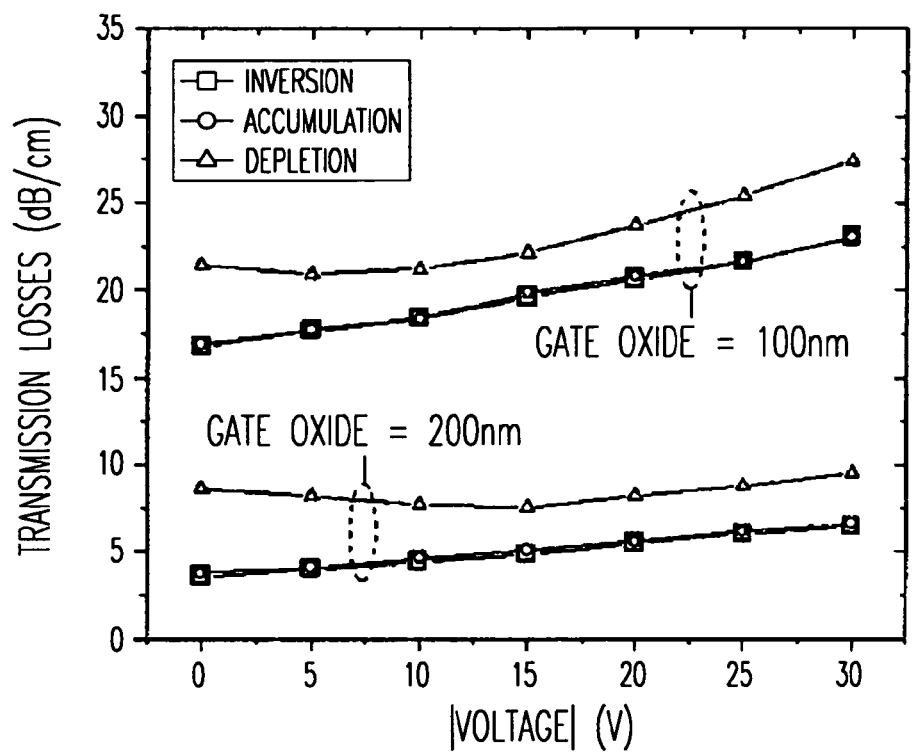
FIG. 8 illustrates optical losses for a first embodiment of the TE-like fundamental mode as a function of the absolute value of the gate voltage for inversion (squares), accumulation (circles) and depletion (triangles) operation modes for gate oxide thicknesses of $h_{gox}=100$ nm and $h_{gox}=200$ nm.
Figure 9:
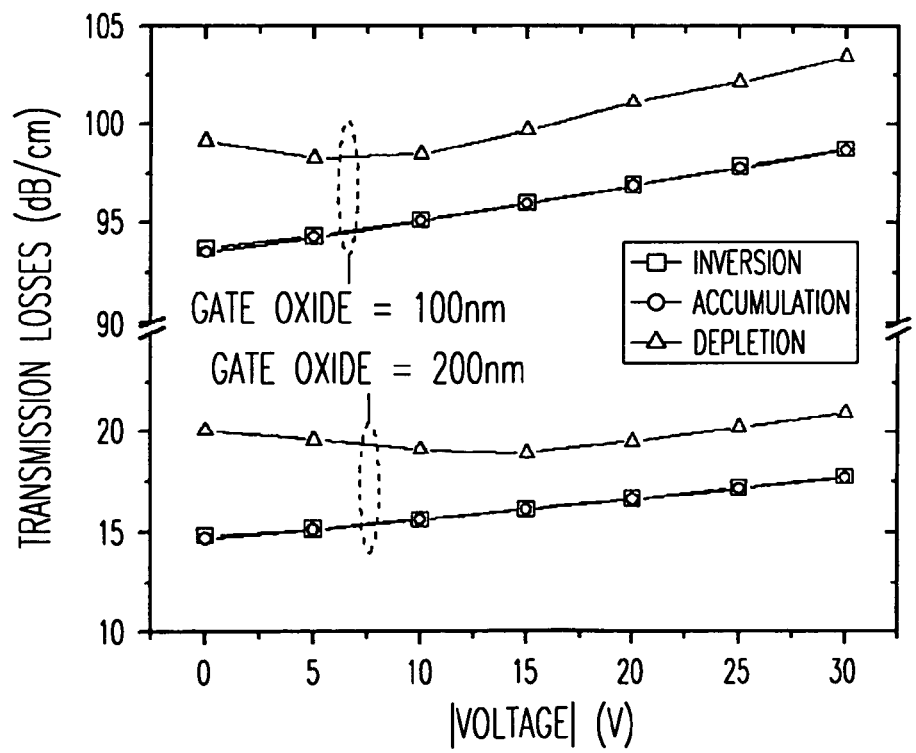
FIG. 9 illustrates optical losses for a second embodiment as a function of the absolute value of the gate voltage for inversion (squares), accumulation (circles) and depletion (triangles) operation modes for gate oxide thicknesses of $h_{gox}=100$ nm and $h_{gox}=200$ nm.
Figure 10A:
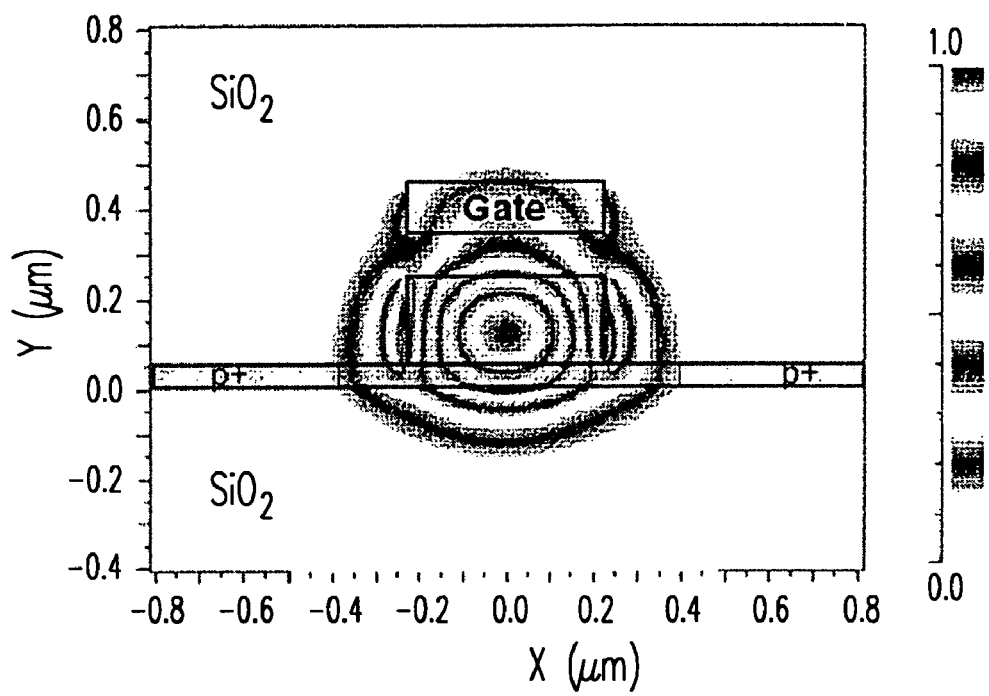
FIGS. 10A and 10B illustrate fundamental optical mode profile for a) $h_{gox}=100$ nm and b) $h_{gox}=200$ nm for a first embodiment.
Figure 10B:
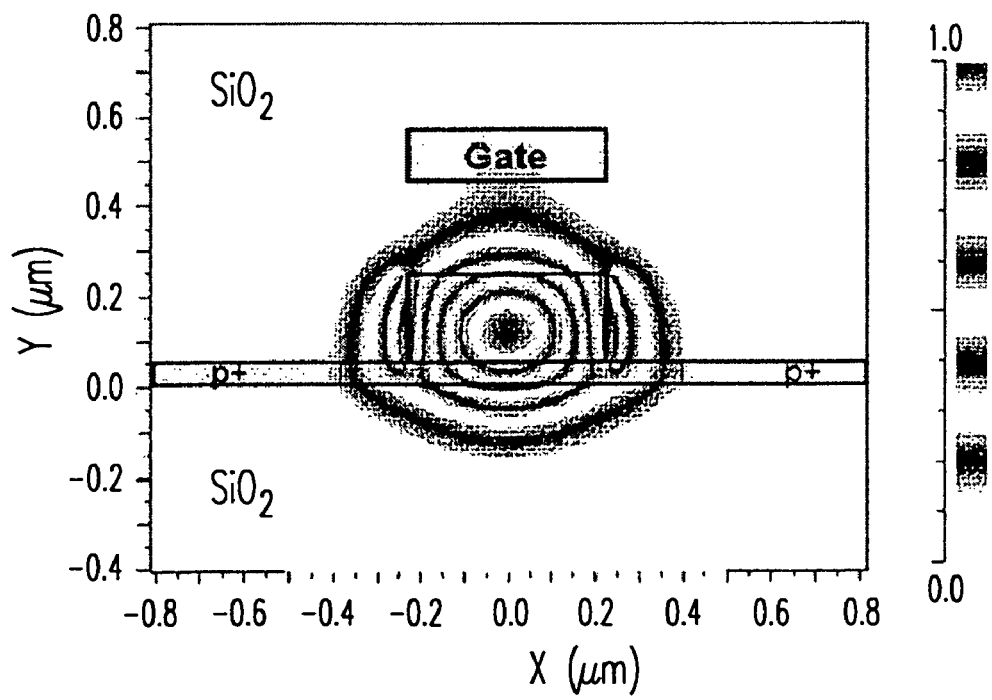
Figure 11A:
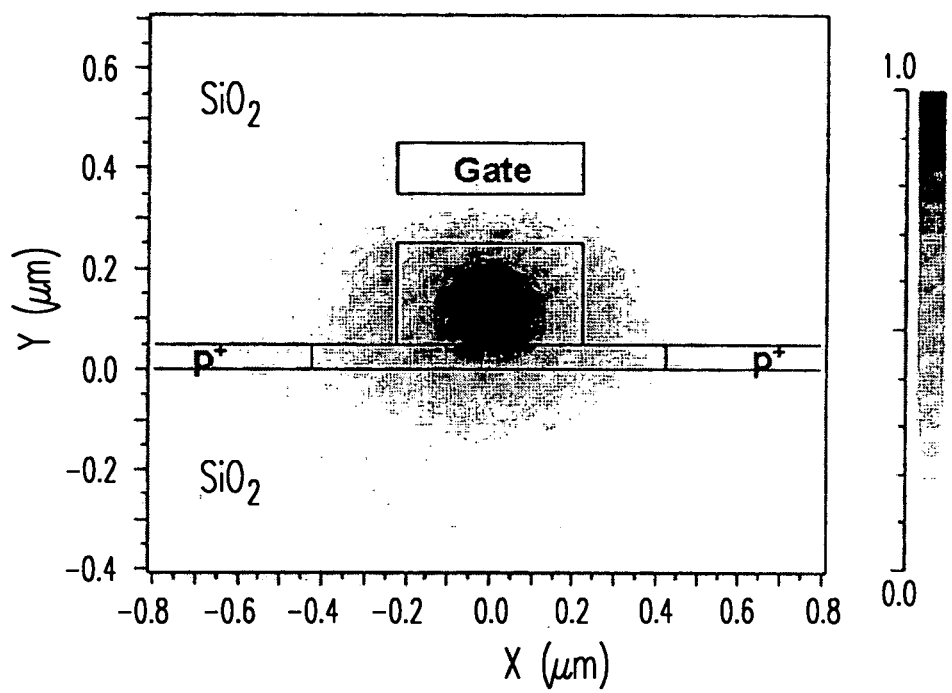
FIGS. 11A and 11B illustrate TE-like fundamental optical mode profiles for a) $h_{gox}=100$ nm and b) $h_{gox}=200$ nm for a second embodiment.
Figure 11B:
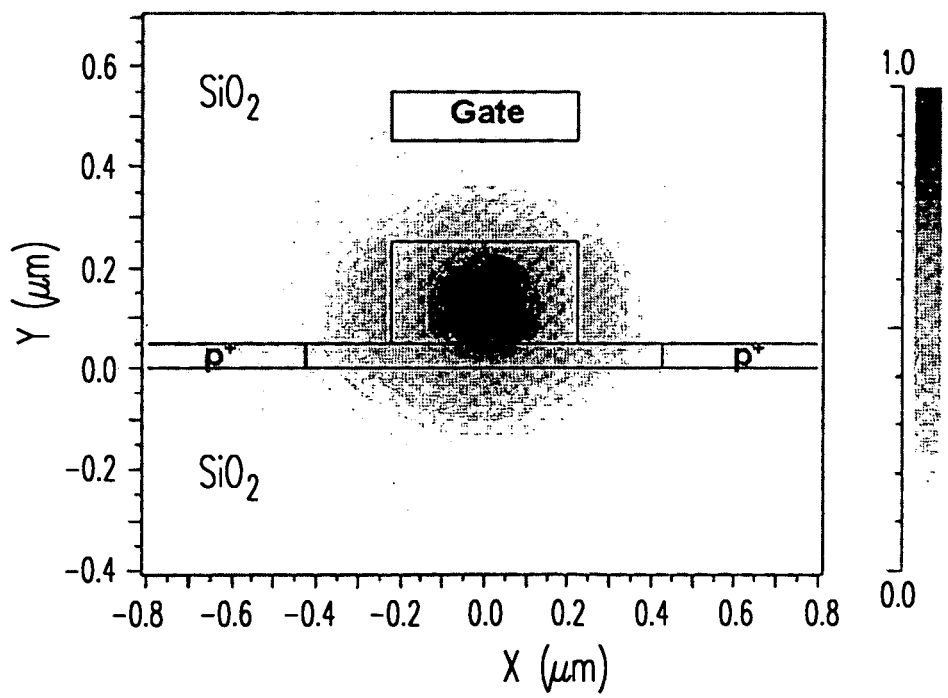

FIG. 8 illustrates calculated optical losses for the TE-like mode due to carrier absorption in the semiconductor and the gate as a function of the gate voltage for the first embodiment. FIG. 9 illustrates the calculated losses due to carrier adsorption in the semiconductor and metal as a function of the gate voltage for the second embodiment, having metal contacts. The losses in both embodiments for $h_{gox}$=100 nm are considerably higher than those for $h_{gox}$=200 nm. This is because the optical mode overlaps significantly with the gate electrode for $h_{gox}$=100 nm, as shown in FIG. 10A for the first embodiment and FIG. 11A for the second. Smaller overlap occurs for $h_{gox}$=200 nm (FIG. 10B, FIG. 11B). It is also observed in FIG. 8 that, for both values of $h_{gox}$, the losses for the depletion mode configuration are higher than those exhibited by the other two configurations, due to the background doping concentration of the Si waveguide ($2\times10^{17}$ cm$^{-3}$). One can also see that, as $V_g$ increases, the depletion-mode losses initially decrease (increase of the depletion layer width), reach a minimum (at approximately $V_t$) and then increase again (strong inversion condition). Note however, that, as will be seen below, the losses for the depletion case can be different under dynamic operation.

According to these results, under dc operation, the accumulation- or the inversion-mode configurations should be desirable since they exhibit losses as low as 3.6 dB/cm for $V_g$=0 V ($h_{gox}$=200 nm) for the first embodiment, and 15 dB/cm for 5V in the second embodiment. The simulations discussed so far are for TE-like polarization. For the TM-like mode the lower losses achievable are significantly higher, on the order of 20 dB/cm ($h_{gox}$=200 nm) for the first embodiment and on the order of 59 dB/cm for the second embodiment; therefore hereafter we consider only the TE-like fundamental modes for the operation of the device. For the second embodiment, for TE-like mode, it is also deduced from the simulations that the thickness of the gate oxide should be $h_{gox}$=200 nm rather than $h_{gox}$=100 nm in order to avoid excessive losses due to the metal gate electrode. A gate oxide thickness of 200 nm will be also assumed for both embodiments in order to avoid excessive losses due to the gate electrode.

The small-signal transient response determines the feasibility of the device to be used for high-speed data modulation. In the studied configurations, the small-signal response will be defined by the MOS total capacitance ($C_T$), which is given by the series combination of the gate oxide capacitance ($C_{gox}$) and the semiconductor depletion-region capacitance ($C_d$). The value of $C_{gox}$ is constant and corresponds to the maximum capacitance of the system. The value of $C_T$ will depend on the operation mode of the MOS diode. Below, the small signal characteristics for the three modes of operation are discussed for the various embodiments.

In the accumulation regime (FIG. 5B), there is no depletion region, therefore $C_T=C_{gox}$. This capacitance remains the same under high frequency operation. For $h_{gox}$=200 nm, we calculated a value of $C_{gox}$=$10^{-6}$ F/µm. Thus, assuming a load impedance of R=50 Ω and $C_T=C_{gox}$, the time constant $\tau_c$=$RC_T$ of the device results to be $5\times10^{-15}$ s/µm. For example, for a 20-µm-long device, $\tau_c$=$1\times10^{-1}$ ps, indicating the suitability of this configuration for high-speed operation. The optical losses will be the same as those calculated in the dc analysis for any operation frequency and gate voltage under the accumulation mode of operation.

For the depletion-mode structure shown in FIG. 5C, the total capacitance of the system will depend on the operation frequency and bias voltage. At low frequencies and $V_g<V_t$, the total capacitance will be smaller than $C_{gox}$ due to the depletion region capacitance. At low frequencies and $V_g>V_t$ (strong inversion), the formation of the inversion layer makes the total capacitance equal to the gate oxide capacitance, as in the accumulation case. At higher frequencies, $C_T$ will coincide with that at low frequencies for $V_g<V_t$; however, for $V_g>V_t$, the electron (inversion layer) concentration will not be able to follow the ac signal and the depletion region capacitance will lead to smaller $C_T$, producing a smaller time constant than in the accumulation regime. For example, we calculated $C_T$=$9.47\times10^{-17}$ F/µm for $V_g$=20 V and ac frequency of 1 MHz. This suggests that even higher speed-operation can be achieved with the depletion mode than with the accumulation mode. Note that, in this case, since the depletion region width remains constant for $V_g>V_t$ (constant capacitance), the optical losses of the structure will be approximately constant for $V_g>V_t$, and equal to the minimum value obtained in the dc analysis (7.67 dB/cm for the first embodiment, and 18.95 dB/cm for the second, metal contact embodiment).

The threshold voltage of the inversion configuration (FIG. 5A) was estimated to be −1.42 V. This means that the MOS diode will work mainly under strong inversion conditions. Therefore, due to the aforementioned inability of minority carriers to follow high frequency electrical signals, we can infer that the inversion-mode configuration is not appropriate for high-speed electro-optic modulation.

Thus, for small signal ac operation either the accumulation- or the depletion modes could be considered. The former exhibits less loss, while the latter may operate at higher frequency.

Figure 12A:
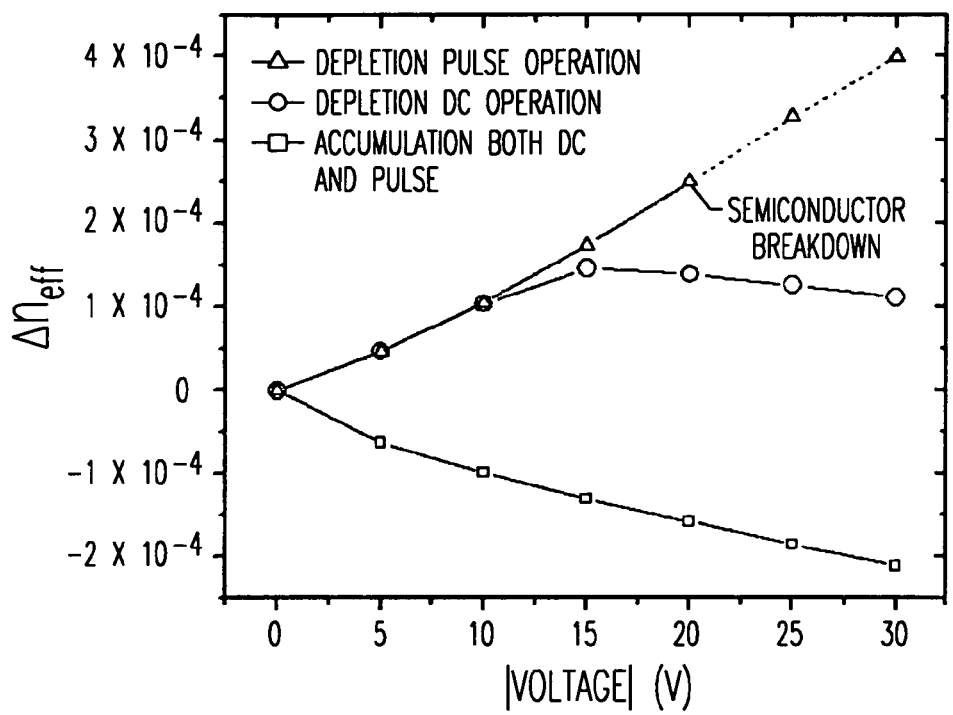
FIGS. 12A, 12B and 12C illustrate A) Effective refractive index variation of the TE-like fundamental mode as a function of the absolute value of the ON-state gate voltage for depletion-mode under pulse (triangles) and dc (circles) operation and for the accumulation-mode (squares), B) Optical losses for the same configurations, and C) optical losses for a second embodiment, where dashed lines indicate that the Si breakdown electric field has been exceeded, the gate oxide thickness is $h_{gox}=200$ nm, and the applied voltage is negative for the accumulation case and positive for the depletion mode.

A large-signal transient (pulse operation) study of the accumulation- and depletion-mode structures may be carried out by using ATLAS. A 100-ns-long gate voltage pulse with OFF-state gate voltage $V_{g,OFF}$=0V and ON-state gate voltage $V_{g,ON}$<0 for accumulation and $V_{g,ON}$>0 for depletion, may be applied to the simulated device. Rise and fall times of the voltage pulse were equal to 10 ps. FIG. 12A shows the calculated $\Delta n_{eff}$ for the accumulation- and depletion-mode configurations under pulse operation as a function of $|V_{g,ON}|$. The dc operation curve for the depletion mode has been also included for comparison purposes. The variation of $\Delta n_{eff}$ corresponding to the accumulation is the same for both dc and transient operations. However, a significant $\Delta n_{eff}$ increase is observed for the depletion case when it is pulse-operated as compared to the dc operation for gate voltages equal or higher than the threshold voltage ($V_t$=14.9 V). This is because, for those gate voltages, the device is operated under deep depletion conditions: the inversion layer is not or is only partially formed since the generation of minority carriers cannot keep up with the amount needed to form the inversion layer and, therefore, the depletion layer can increase beyond its maximum steady-state value, resulting in a capacitance that further decreases with voltage. The rate of change of the gate voltage (pulse ramp slope) required to observe deep depletion is given by:

$$\frac{dV_g}{dt} > \frac{qn_i}{2C_{gox}}\sqrt{\frac{\mu_n V_t}{\tau_n}} \qquad [3]$$

where q is the electron charge, $n_i$ ($\approx 10^{10}$ cm$^{-3}$ at 300 K) is the intrinsic carrier concentration of Si, $C_{gox}$ (=2.22×10$^{-8}$ F/cm$^2$) is the oxide capacitance per unit area, and $\mu_n$ (=1000 cm$^2$/Vs at 300 K) is the electron mobility. Thus, (d$V_g$/dt) should be higher than 5.2×10$^3$ V/s, which is easily accomplished by ramp times employed in high-speed digital signals.

Figure 12B:
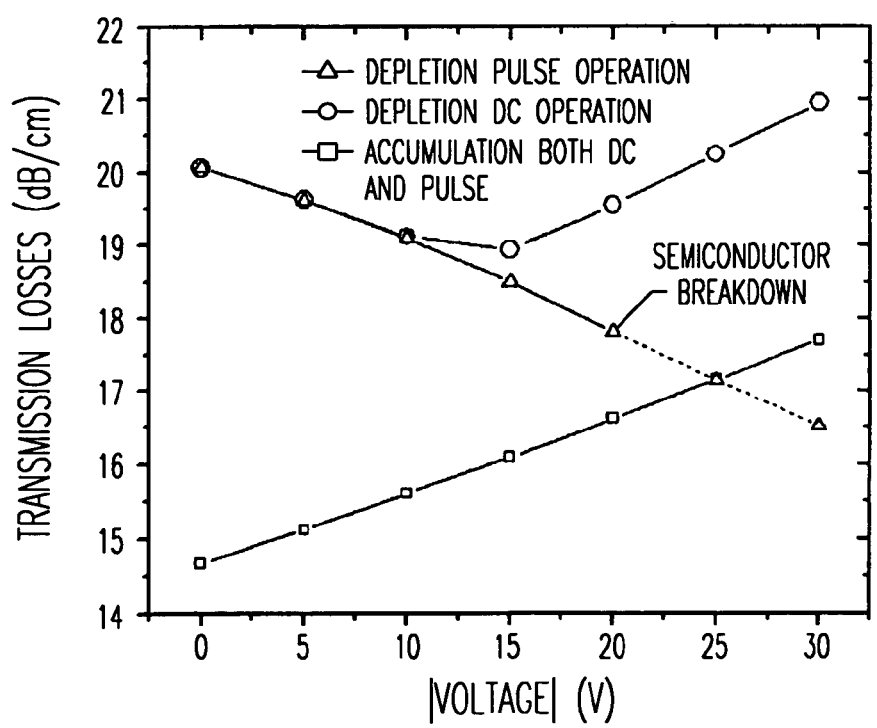
Figure 12C:
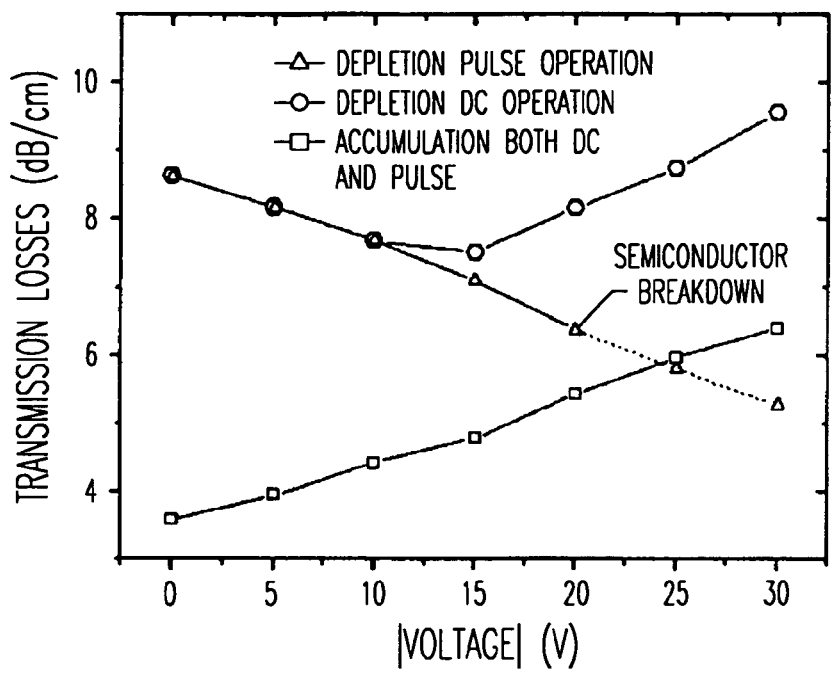

The absence of the inversion layer in the depletion-mode device under pulse operation also leads to a decrease of the transmission losses under deep depletion operation as shown in FIG. 12B for the first embodiment and FIG. 12C for the second, metal contact embodiment.

For depletion, gate voltages higher than 20 V may lead to an electric field in the semiconductor beneath the gate oxide higher than 3×10$^5$ V/cm, which is the breakdown electric field in Si. This imposes a limitation on the allowed gate voltage (20 V) and, therefore, on the maximum effective refractive index change (2.5×10$^{-4}$) and minimum transmission losses (6.37 dB/cm for the first embodiment, or 17.82 dB/cm for the second embodiment) that can be obtained under deep depletion operation.

Table II shows the calculated turn-on and turn-off times of the accumulation and depletion devices for different ON-state gate voltages. The turn-on (turn-off) time is defined as the time needed for the carrier concentration to reach its maximum (minimum) value when the gate voltage is stepped from $V_{g,OFF}$ ($V_{g,ON}$) to $V_{g,ON}$ ($V_{g,OFF}$). Switching times (turn-on time +turn off time) on the order of tens of ps are predicted, the depletion operation being slightly faster than the accumulation, as expected from the small-signal analysis.

TABLE II

| |Accumulation| |Depletion| |
|---|---|---|---|---|
|$|V_{g,ON}|$ (V)|Turn-on (ps)|Turn-off (ps)|Turn-on (ps)|Turn-off (ps)|
|5|25.5|25.5|10.5|12.7|
|10|25.5|25.5|12.5|12.7|
|15|19.1|36.3|14.7|12.2|
|20|19.1|34.9|14.3|11.9|
|25|19.1|33.1|15.1|11.6|
|30|19.1|32.5|16.8|11.3|

Electro-optic Microresonator Modulator

Figure 13:
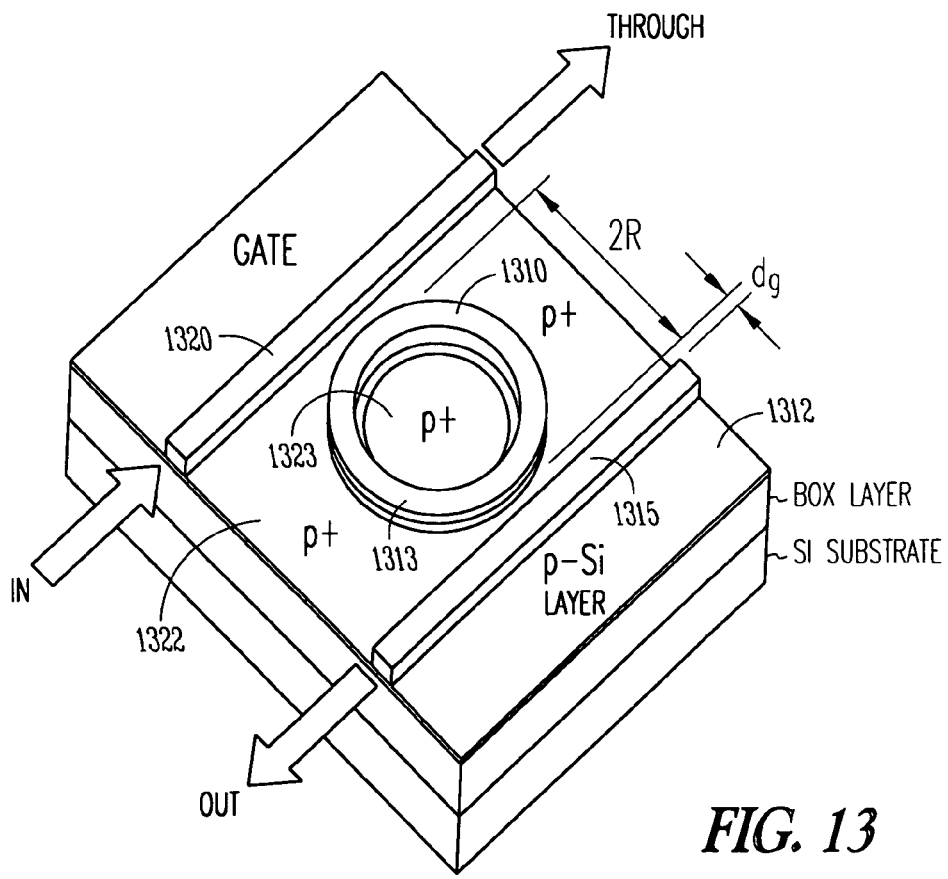
FIG. 13 illustrates a high-index-contrast waveguide electro-optic modulator based on a microring resonator and a MOS diode where the complex refractive index of the resonant region is changed by applying a bias voltage to the gate electrode.

The transmission of an optical resonator is highly sensitive to small index changes, making it ideal for intensity modulation in a short length. Thus, a suitable application of the studied configuration is a waveguide intensity modulator based on a microring resonator as that shown in FIG. 13. R is the radius of a ring waveguide 1310 formed on a p-silicon layer 1312 with gate 1313 formed on top, and $d_g$ is the spacing between the ring and bus waveguides 1315 and 1320 ($d_g$ is the same for both buses). A MOS diode with p+ regions 1322 and 1323, and with $h_{gox}$=200 nm is used to change the refractive index in the ring waveguide. The resulting phase change in the ring is converted into an intensity variation at the output port at the operation (probe) wavelength.

The output transmissivity (out port) of the microring modulator may be estimated by using the transfer matrix method. Bending losses were calculated by employing the BPM, and the spacing between ring and bus waveguides was estimated by using the finite difference time domain method (FDTD). The ring radius and the power-coupling coefficient ($|\kappa^2|$), which is related to $d_g$, will determine the main resonator parameters: quality factor Q (=$\omega_0/\Delta\omega_{FWHM}$, with $\omega_0$ the resonance frequency and $\Delta\omega_{FWHM}$ the full frequency width at half maximum), cavity lifetime $\tau_{ph}$(=Q/$\omega_0$), and total internal loss $A_i$ [=($\alpha_T$+$\alpha_{bend}$)2$\pi$R, with $\alpha_T$ the transmission losses and $\alpha_{bend}$ the bending losses]. For optimum performance, it is required: high Q, for high modulation; small $\tau_{ph}$, for high switching speed; and low $A_i$, for high transmittance. In order to have a resonance at the probe wavelength $\lambda_{probe}$=1550 nm, the ring radius must also satisfy the condition 2$\pi$R=m($\lambda_{probe}$/2$n_{eff}$), where m is an integer and $n_{eff}$=$n_{eff,OFF}$+$\Delta n_{eff}$, with $n_{eff,OFF}$ being the effective index in the OFF state ($V_g$=0V) and $\Delta n_{eff}$ being the variation of the effective refractive index when a gate voltage is applied (ON state). For the unbiased case, a trade-off among the aforementioned ring parameters is found for R=6.9 μm and $|\kappa^2|$=0.012, which corresponds to a gap spacing $d_g$=490 nm. This results, for the accumulation case, in Q=2.82×10$^4$, $\tau_{ph}$=23.2 ps and $A_i$=0.028 dB ($\alpha_T$=3.6 dB/cm and $\alpha_{bend}$=2.9 dB/cm). For the depletion case, we obtain Q=2.14×10$^4$, $\tau_{ph}$=17.6 ps and $A_i$=0.065 dB ($\alpha_T$=8.6 dB/cm and $\alpha_{bend}$=6.4 dB/cm). Note that the bending losses are higher for depletion because the refractive index of the core waveguide at zero bias is smaller (due to the background doping of 2×10$^7$ cm$^{-3}$) than that of the accumulation case; thus, the index contrast between the Si core and the oxide cladding is reduced, resulting in a weaker optical confinement in the bent waveguide (higher radiation losses) than that obtained for the accumulation case. It is also seen, that for the same ring parameters, the depletion device exhibits a poorer Q than the accumulation device due to the higher losses (both transmission and bend) in the former.

The value of $\tau_{ph}$ for the depletion device is higher than the turn-on and turn-off times due to carrier distribution (Table II), meaning that the switching speed for this configuration will be limited by $\tau_{ph}$=17.6 ps. For the accumulation device, the calculated turn-on and turn-off times due to carrier dynamics (Table II) at low voltage operation (5 V and 10 V) are higher than the photon lifetime of the ring (23.3 ps); therefore, the carrier-induced transient times will limit the switching speed of the ring modulator for the accumulation configuration.

Figure 14:
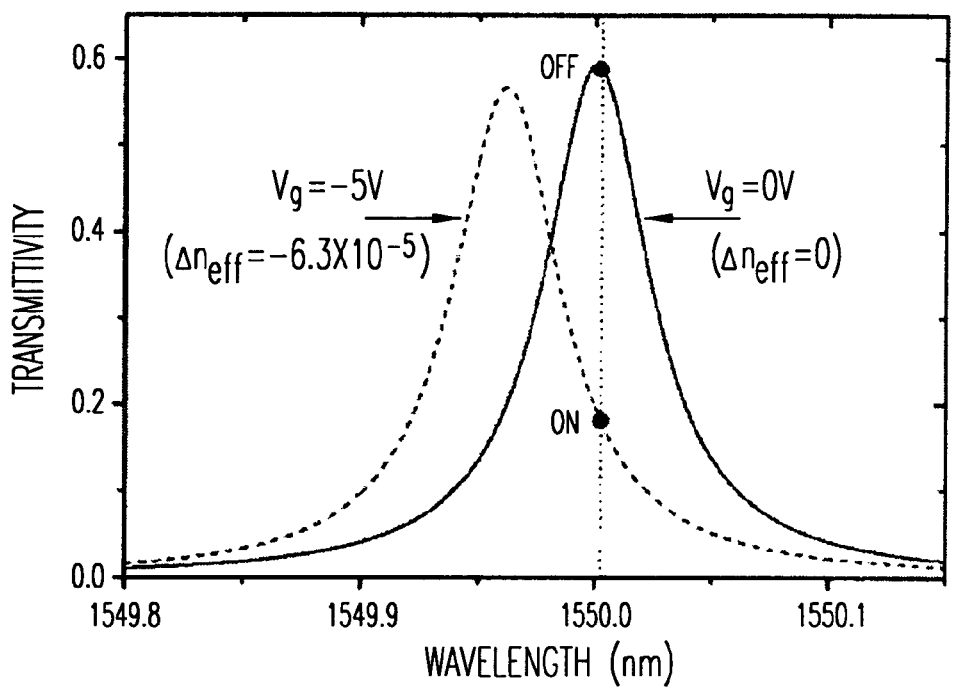
FIG. 14 illustrates spectral transmittance (out port) for the TE-like fundamental optical mode of the simulated electro-optic MOS Si microring modulator (accumulation configuration) for $V_g=0V$ (OFF state) and $V_g=-5V$ ($\Delta n=-6.3\times10^{-5}$, ON state) for a ring radius of R=6.9 μm, where circles illustrate the modulation depth at $\lambda_p=1550.014$ nm.
Figure 15:
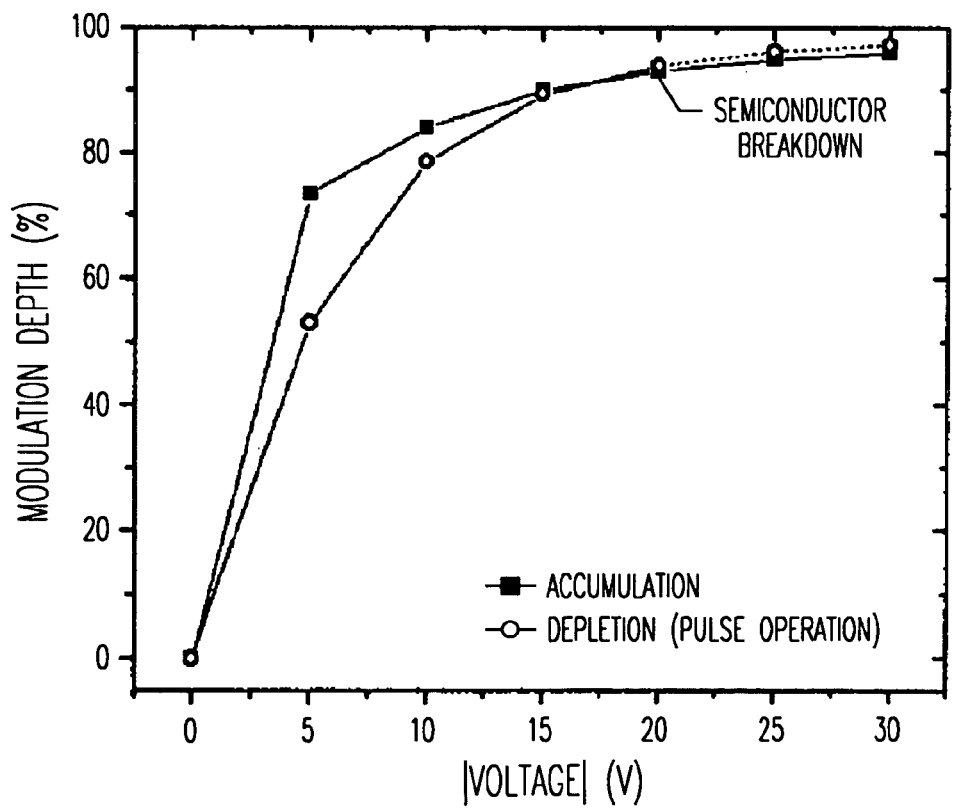
FIG. 15 illustrates calculated modulation depth of the electro-optic MOS microring resonator for the accumulation (squares) and depletion (circles) modes where the probe wavelengths are 1550.014 nm and 1549.975 nm for the accumulation and depletion cases, respectively and the transmittivity in the OFF state at the corresponding probe wavelength was calculated to be 59% and 23% for the accumulation and depletion cases, respectively.

The modulation depth (M) of the microring modulator at a given wavelength is defined as ($P_{OFF}$–$P_{ON}$)/$P_{OFF}$, where $P_{OFF}$ and $P_{ON}$ are the transmitted output power (out port) in the OFF and ON states, respectively. FIG. 14 shows the transmission characteristics (output port) for the aforementioned ring parameters (R=6.9 μm and $|\kappa^2|$=0.012) for the accumulation mode configuration. The refractive index in the cavity is modulated between $V_g$=0V (Δn=0, OFF state) and $V_g$=–5V (Δn=–6.3×10$^{-5}$, ON state). The obtained modulation depth and transmittivity at the probe wavelength, 1550.014 nm, are 73.4% and 59%, respectively. We calculated the modulation depth for the accumulation and depletion operation modes as a function of the gate voltage (FIG. 15). Pulse operation (section IV.C) is assumed for both modes. The probe wavelengths, 1550.014 nm for accumulation and 1549.975 nm for depletion, have been chosen in order to obtain a transmittivity (T) value of 59% and 23% for the accumulation and depletion modes, respectively, in the OFF-state. It is seen that modulation depths higher than 73% can be achieved under the accumulation operation mode for $|V_g|\geq$5 V. Note that, despite higher values of $|\Delta n_{eff}|$ are obtained under depletion than under accumulation for $|V_g|\geq$10 V (see FIG. 6a), the modulation depth is higher for the latter. This is due to the aforementioned higher losses exhibited by the depletion configuration, which degrades the quality factor of the resonator, and therefore, the achievable modulation depth.

Due to the non-negligible value of the thermo-optic effect in Si ($dn/dT \approx 2 \times 10^{-4}$ $K^{-1}$), temperature effects on the index should be minimized in the studied configurations. This can be achieved by employing strain silicon waveguide introduced in the fabrication process by, for example, controlling the overcladding deposition conditions. The introduced strain induces a decrease of the refractive index with temperature, which counterbalances the thermo-optic effect in silicon.

Figure 16:
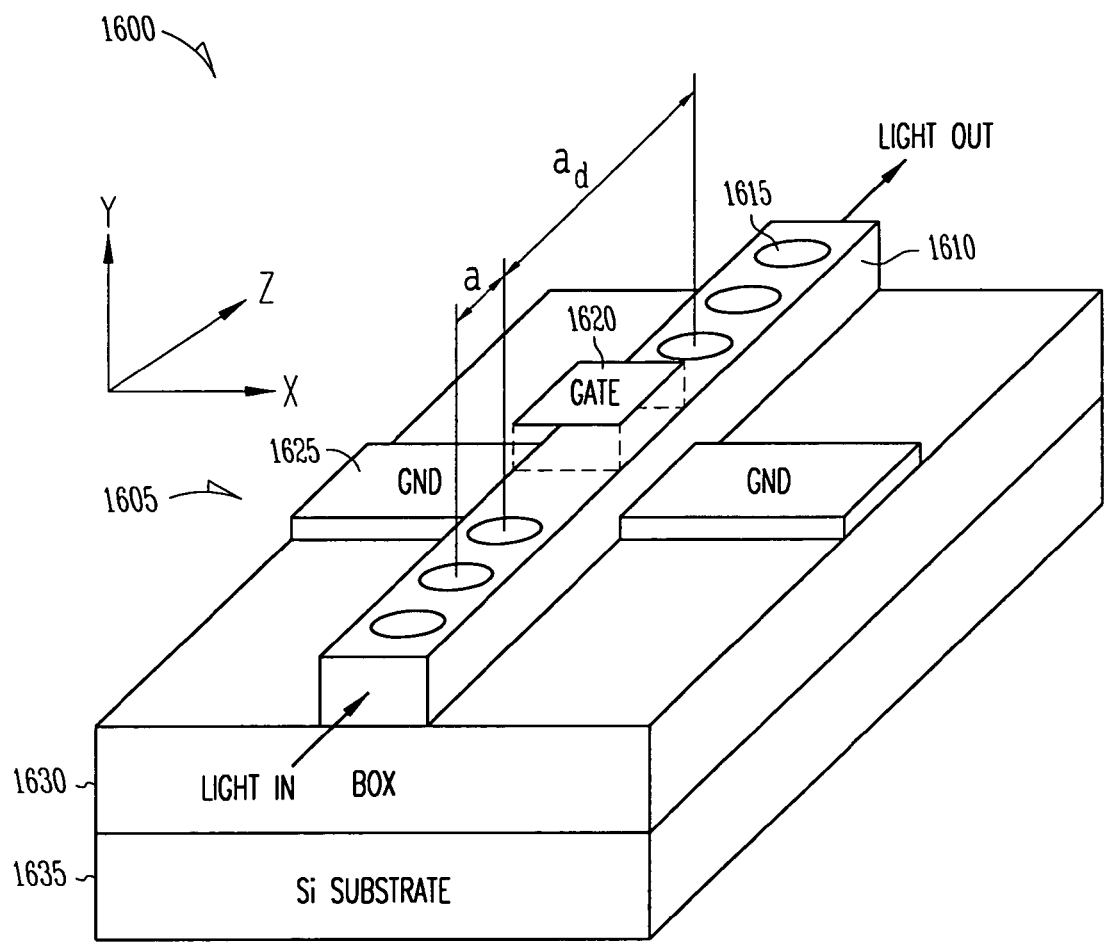
FIG. 16 illustrates a high-index-contrast waveguide electro-optic modulator based on a microcavity and a MOS diode, where the complex refractive index of the resonant region is changed by applying a bias voltage to the gate electrode.

In a further embodiment, the transmission at the resonance wavelength of an optical cavity is highly sensitive to small index changes, making them ideal for intensity modulation in a short length. Thus, an immediate application of the studied configuration is a straight waveguide intensity modulator based on a microcavity illustrated generally at 1600 in FIG. 16. FIG. 16 is a schematic of a high-index-contrast rib SOI waveguide 1610 microcavity in which air (or $SiO_2$-filled) holes 1615 have been defined in order to provide a high-index-contrast periodic structure [one-dimensional photonic crystal]. A MOS diode indicated generally at 1605 with $h_{gox}$=200 nm is used to change the refractive index in the cavity region. Diode 1615 has a gate 1620 formed over a center portion of waveguide 1610, between sets of holes 1615. Ground contacts 1625 are formed adjacent the waveguide 1610. The waveguide 1610 and diode 1605 are formed on an oxide 1630 supported by a silicon substrate 1635 in one embodiment. Other materials may be used in further embodiments.

The performance of the device assuming that the microcavity is estimated equivalent to a Fabry-Perot (F-P) cavity defined by distributed Bragg reflectors of reflectivity R, diffraction losses D, cavity length $a_d$ and internal losses $A_c$. The transmission characteristics of the resonator may be calculated by using the equation:

$$T(\lambda) = T_{lm}(\lambda)[1 - D] \quad [4]$$

$$= \left( \frac{A_c(1-R)^2}{(1-A_cR)^2 + 4A_cR\sin^2\left(\frac{2\pi n_{eff} a_d}{\lambda}\right)} \right) \cdot [1-D]$$

where $T_{lm}(\lambda)$ is the transmittivity of the lossless-mirrors F-P cavity. $n_{eff}=n_{eff,OFF}+\Delta n_{eff}$, where $n_{eff,OFF}$=2.52 is the effective index in the OFF state ($V_g$=0V) and $\Delta n_{eff}$ is the variation of the effective refractive index when a gate voltage is applied (ON state). The following values were assumed: R=97% [8], D=17% [8], $a_d$=21.56 µm [≈70(1.55 µm/2$n_{eff,OFF}$)]. The considered values of $A_c$ are those shown in FIG. 12A. The modulation depth (M) at a given wavelength is defined as ($P_{OFF}$–$P_{ON}$)/$P_{OFF}$, where $P_{OFF}$ and $P_{ON}$ are the transmitted power in the OFF and ON states, respectively.

Figure 17:
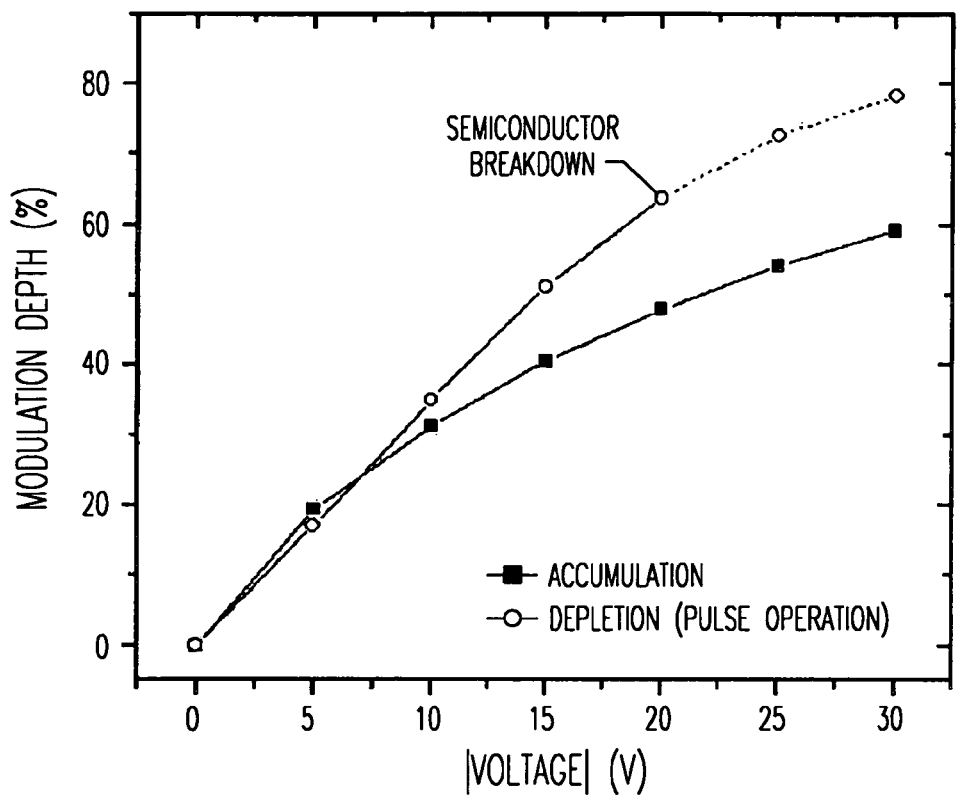
FIG. 17 illustrates calculated modulation depth of the electro-optic MOS microcavity for the accumulation (squares) and depletion (circles) modes, where dashed line indicates that the Si breakdown electric field has been exceeded, the probe wavelengths are 1550.04 nm and 1549.91 nm for the accumulation and depletion cases, respectively and the transmittivity in the OFF state at the corresponding probe wavelength was calculated to be 50% and 33% for the accumulation and depletion cases, respectively.

FIG. 17 shows the calculated modulation depth for the accumulation and depletion operation modes as a function of the gate voltage. Pulse operation is assumed for both modes. The probe wavelengths, 1550.04 nm for accumulation and 1549.91 nm for depletion, have been chosen in order to obtain a transmittivity (T) value of 50% and 33% for the accumulation and depletion modes, respectively, in the OFF-state (zero bias). It is seen than modulation depths higher than 19% can be achieved under the accumulation operation mode for $|V_g| \geq 5$ V. As expected from FIG. 12A, for $|V_g| \leq 7$ V, the accumulation mode provides higher modulation, whereas for $|V_g| \geq 7$ V, the depletion device exhibits higher modulation. The modulation could be increased by increasing the cavity length; however, this would lead to a significant reduction of transmission due to the cavity losses (gate electrode losses). Therefore, a trade-off between modulation and transmission must be considered.

Figure 18:
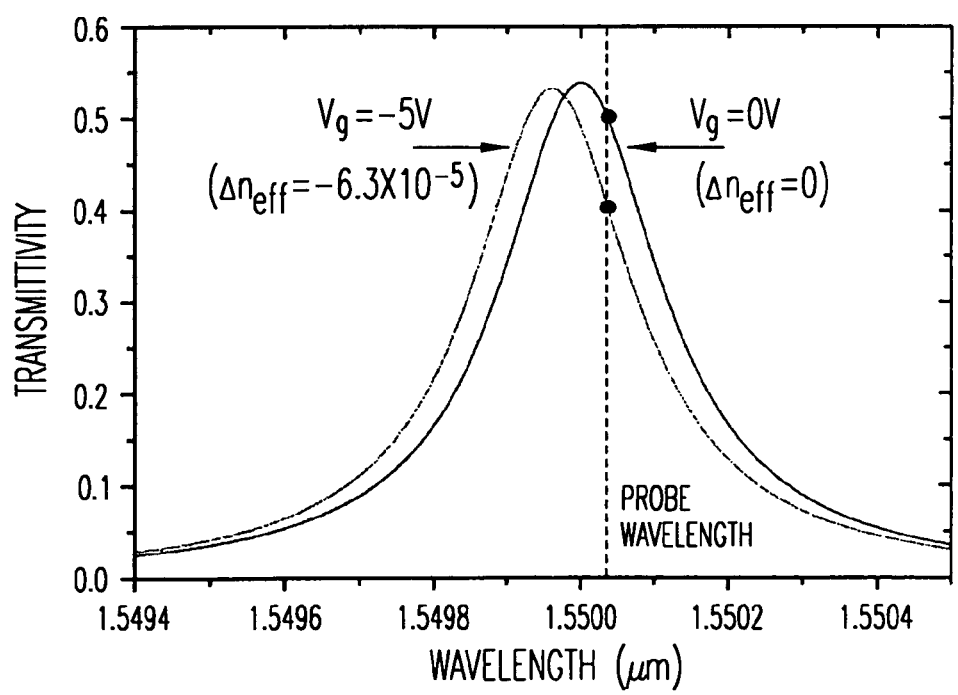
FIG. 18 illustrates spectral transmittance for the TE-like fundamental optical mode of the simulated electro-optic MOS Si modulator for $V_g$=0V (OFF state) and $V_g$=−5V ($\Delta n$=−6×10$^{-5}$, ON state) for a 21.56-μm-long cavity, where circles illustrate the modulation depth at $\lambda_p$=1.55004 μm.

FIG. 18 shows the transmission characteristics of a 21.56-µm-long cavity for the accumulation mode configuration. The refractive index in the cavity is modulated between $V_g$=0V (OFF state) and $V_g$=–5V ($\Delta n$=–6×10$^{-5}$, ON state). The modulation depth and transmittivity at the probe wavelength, 1550.04 nm, are 19.3% and 50%, respectively. Note that the probe wavelength is not chosen at exactly the resonance peak, 1.55 µm, but slightly shifted towards one of the lobe slopes ($\lambda_p$=1.55004 µm) in order to obtain maximum modulation depth.

The photon lifetime ($\tau_{ph}$) of the 21.56-µm-long resonator, that is, the time for the stored energy in the cavity to vanish after the external supply is shut off, was estimated to be 4.8 ps [=$\lambda_r/\Delta\lambda_{1/2}$, where $\lambda_r$ is the resonance wavelength (=1.55 µm) and $\Delta\lambda_{1/2}$ is the full width at half maximum at the resonance wavelength]. The value of $\tau_{ph}$ is smaller than the switching times obtained in section IV.C, meaning that the transient response of the modulator will be determined by the hole concentration dynamic distribution (switching times on the order of 10 ps).

The order of magnitude of $|\Delta n_{eff}|$ achievable in the studied configurations is on the same order of magnitude than that produced by the thermo-optic effect in Si ($dn/dT \approx 2 \times 10^{-4}$ $K^{-1}$). This implies that in order to avoid undesired thermo-optic effects an accurate control of the device (or chip) temperature is necessary. In addition, an accurate control of the probe wavelength and/or of the cavity length is desired for optimum operation of the modulator.

For the sake of comparison, Table III shows a list of proposed all-silicon electro-optic modulators recently reported in the literature. The MOS device analyzed in this work is expected to improve significantly previous designs in terms of switching time and dc power consumption

TABLE III

| | Electrical structure | Optical structure | M (%) | DC Power (mW) | $t_s$ (ns) | Length (µm) |
|---|---|---|---|---|---|---|
| Prior devices | p-i-n | Bragg reflector | 50 | 4 | 24.7 | 3200 |
| Prior devices | BMFET | FCAM | 20 | 126 | 6 | 1000 |
| Prior devices | p-i-n | Mach-Zehnder | >90 | 210 | 60 | 1110 |
| Prior devices | BMFET | Y-junction | 92 | ~350 | 16 | 5000 |
| Prior devices | p-i-n | Bragg reflector | 94 | 0.3 | 5 | 3200 |
| Prior devices | p-i-n | Mach-Zehnder | >90 | ~0.56 | 0.51 | >500 |
| Prior devices | p-i-n | F-P | 80 | 0.014 | 1.3 | 10 |
| Prior devices | MOS | Mach-Zehnder | 97.5 | ~0.0 | ~0.6 | 10000 |
| Our device | MOS | F-P | 19 | ~0.0 | 0.023 | 22 |

Electro-optic MOS SOI high-index-contrast waveguide modulators have been described for 1.55-µm operation wavelength. The real refractive index and absorption coefficient of the core Si waveguide are changed by using the free-carrier dispersion effect produced by a MOS diode. A gate oxide thickness of 200 nm has been shown to be a good tradeoff between low gate electrode losses and low bias voltage operation. Both accumulation and depletion operation modes are well suited for high-speed applications, with the former mode exhibiting lower loss. Modulation depths of 73% for a first embodiment, and greater than or equal to approximately 19% for the second metal gate embodiment, and switching times on the order of tens of picoseconds are predicted for bias voltages of only 5 V or higher. The studied electro-optic modulator is therefore a very promising candidate for implementing Si micro- and nano-photonic integrated circuits for high-speed applications.

Mos and Geometries for Integrating Mos and Pin.

MOS can lead to very high speed (perhaps tend to hundreds of G Gbpsec. However, the pin can also work for high speed, perhaps not as high as the MOS but very high (at least 10 Gbpsec). Electro-optic devices such as that shown in FIG. 5B, may be based on MOS structures. The use of a MOS diode should lead to high speed operation than the p-i-n structure (limited by carrier diffusion ) since the carrier distribution in the semiconductor is governed by a drift mechanism (electric field). In a MOS structure however, significant large concentration variations are possible only within small areas beneath the insulated gate region 531. This produces a small overlap between the optical mode and the non-equilibrium charge distribution in the waveguide, leading to a smaller effective index variation in a MOS system than that in a p-i-n configuration. A small index change requires a very long structure, on the order of millimeter, in order to induce a significant modulation depth. A micron-size MOS-based high-index-contrast SOI waveguide for high-speed electro-optic modulation in Si is based on strong light confinement. The light confinement enhances the effect of small index changes on the transmission of the device enabling, an ultra-compact structure with high modulation depth. FIG. 5A shows a schematic cross-section of a MOS-waveguide configuration. The structure consist of a high aspect ratio [rib height (200 nm)>>slab height (50 nm)] rib SOI waveguide 511 with highly doped regions ($10^{19}$ cm$^{-3}$) defined in the slab 541 at each side of the rib. The rib cross section height and width dimension are typical of a 1.55-µm-wavelength high-index-contrast strip SOI waveguide in order to guarantee single mode operation. The speed of the device is limited by its capacitance. Using a gate oxide 531 of 200 nm, the time constant $\tau_c = RC_T$ of the device results to be $5\times10^{-5}$ s/µm. For example, for a 20-µm-long device, $\tau_c = 1\times10^{-1}$ ps, indicating the suitability of this configuration for high-speed operation. A change in index of approximately $6\times10^{-5}$ under 5V and transmission losses of 15 dB/cm in the MOS region is estimated.

Figure 20:
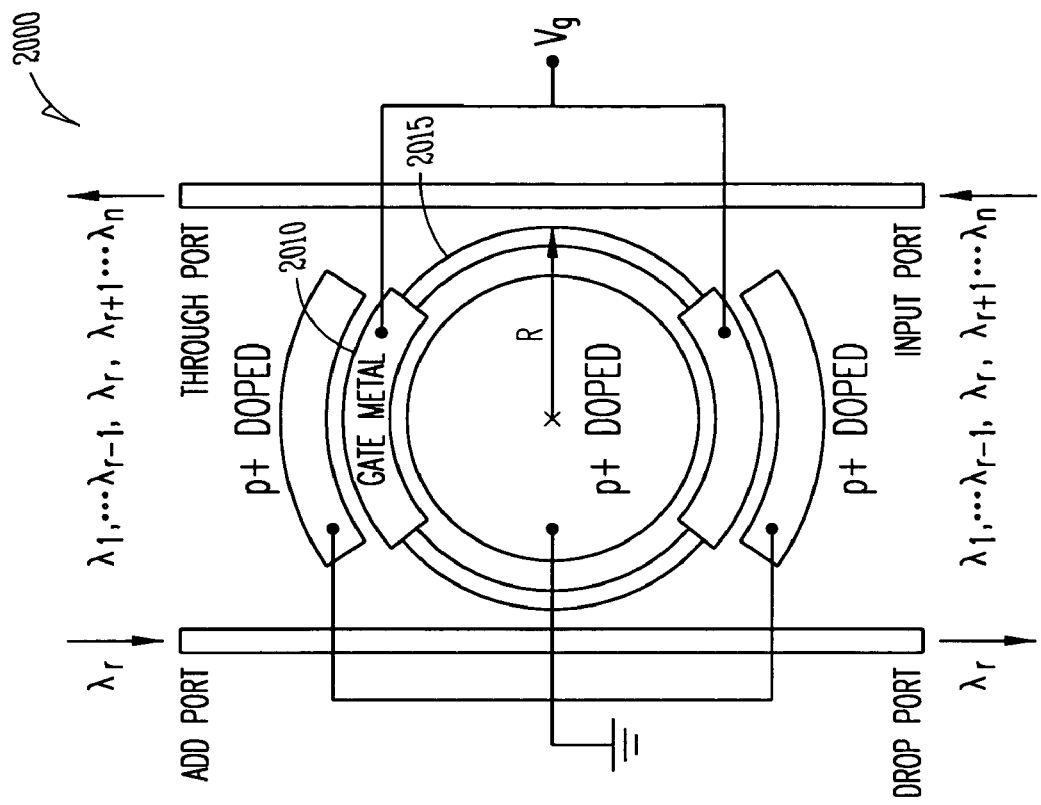
FIG. 20 is a schematic diagram of a ring resonator based optical modulator using the MOS effect.
Figure 19:
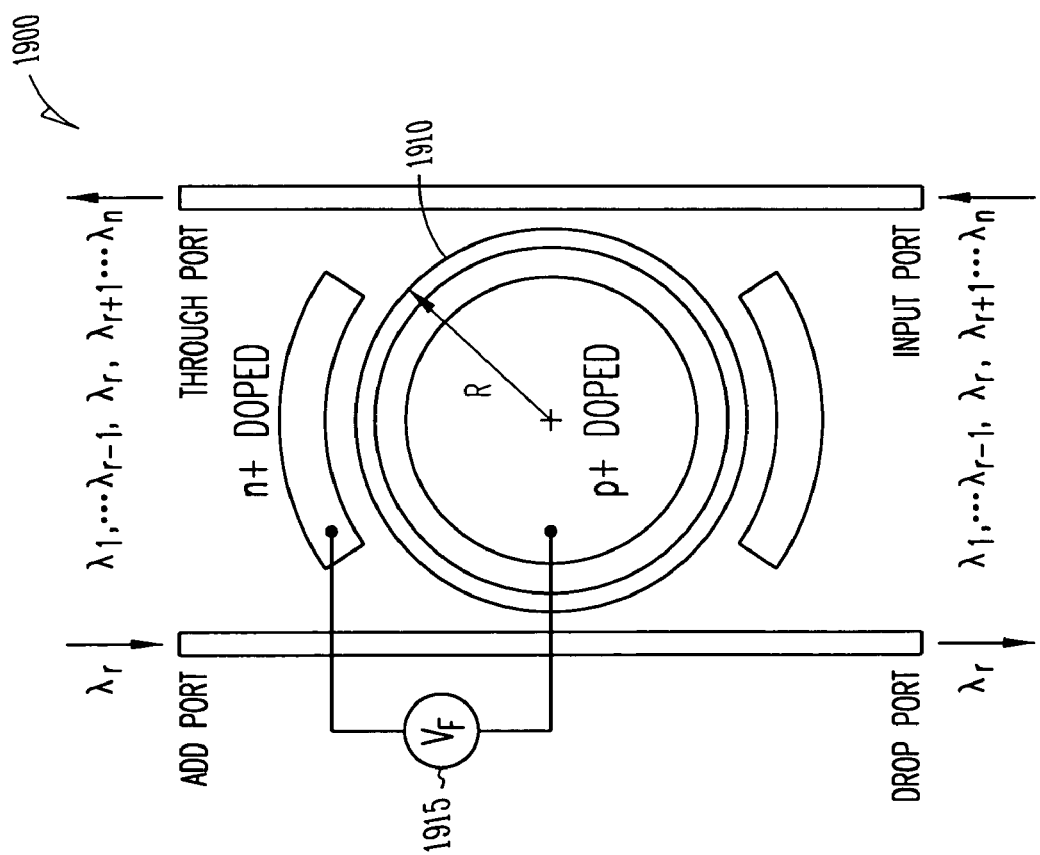
FIG. 19 is a schematic diagram of a ring resonator based optical modulator using the pin effect.

Novel light confinement geometries for modulators and switches in the form of 2D guided-wave structures, such as four port devices for routing signals on-chip (see FIGS. 19 and 20). Note that cavities with extremely high Q, such as for example photonic crystal cavities, may have high losses and bandwidth limitations. Both p-i-n and MOS configurations are considered. The spectral properties, WDM capabilities, bandwidth, modulation depth, size and power dissipation of the devices are investigated with the aim of optimizing the driver performance.

Both devices are based on ring resonators. The resonant nature of the device induces high sensitivity to small index changes making them ideal for high modulation depth at low drive powers for very compact devices.

An example p-i-n structure to be investigated is illustrated at 1900 in FIG. 19. A complex refractive index of the ring 1910 is changed by applying voltage 1915 across anode and cathode probe pads leading to strong modulation. Preliminary calculations show that modulation depth larger than 90% can be achieved close to the resonant wavelength, with dc power consumption of only 1.53 µW/µm for a ring with $Q=\lambda/\Delta\lambda=3000$. This low dissipated power leads to a negligible increase of the device temperature, less than $10^{-2}$ K. From calculations similar to the ones previously shown, it may be estimated that the on-off switching times for such a device may be as small as 50 psec and modulation speeds larger than 5 GHz may be obtained. For smaller modulation depths (~20%), speeds in the tens of GHz range may be obtained.

An example of an MOS structure is shown at 2000 in FIG. 20. The use of a MOS diode leads to high speed operation since the carrier distribution in the semiconductor is governed by a drift mechanism (electric field). A gate electrode 2010 is placed close to the top of the ring resonator 2015. The silicon layer (device layer) has a background doping concentration of $10^{15}$ cm$^{-3}$. The device can be operated in accumulation and depletion mode depending on the gate bias. The exact geometry of the device may be defined so that the losses, due to the overlap of the mode with the highly-doped regions and gate, will be minimized. Preliminary calculations show that a maximum modulation depth of 20% for a ring resonator of Q=3000, using a gate oxide of 100 nm can be achieved using a bias voltage of 5 V.

In order to achieve higher modulation depths, rings with higher Q's may be used. This may be achieved using: 1. a larger distance between the incoming waveguide and the ring resonator than 100 nm, 2. minimizing light scattering in the waveguides due to sidewall roughness by special fabrication methods such as oxidations and 3. using a thicker gate oxide, in order to minimize absorption in the ring.

Electro-optic modulators in the form of ring or disc waveguide resonators and other types of resonators, such as photonic crystal cavities and other cavities that may operate as resonators, may be varied in size. Diameters of ring or disc resonators may be between approximately 10 to 14 um. Other size modulators may also be utilized, such as 30 um diameter modulators and larger or smaller. In one embodiment, the diameter is less than 500 um in diameter.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

The invention claimed is:

1. An electro-optic modulator comprising:
   a ring waveguide supported by a substrate; and
   a p-i-n junction embedded in the ring waveguide having highly doped p and n regions at least partially separated from a resonating mode of the ring waveguide.

2. The electro-optic modulator of claim 1 wherein the p-i-n junction includes highly doped regions on both an inside and outside of the ring waveguide.

3. The electro-optic modulator of claim 1 wherein the ring waveguide comprises a high aspect ratio rib of silicon.

4. The electro-optic modulator of claim 3 wherein the rib of silicon is supported by a slab of silicon, and wherein the highly doped regions are formed in the slab.

5. The electro-optic modulator of claim 1 and further comprising an input port waveguide coupled to a first side of the ring waveguide.

6. The electro-optic modulator of claim 5 and further comprising a second waveguide coupled to a second side of the ring waveguide.

7. The electro-optic modulator of claim 1 wherein the p-i-n junction comprises highly doped n regions on both an inside and outside of the ring waveguide.

8. An electro-optic modulator comprising:

a ring waveguide supported by a substrate; and a MOS diode integrated with the ring waveguide to cause changes in a refractive index of the ring waveguide.

9. The electro-optic modulator of claim 8 wherein the MOS diode comprises:

highly doped regions on both an inside and outside of the ring waveguide; and a gate separated from a top of the ring waveguide by a layer of insulation.

10. The electro-optic modulator of claim 8 wherein the ring waveguide comprises a high aspect ratio rib of silicon.

11. The electro-optic modulator of claim 10 wherein the rib of silicon is supported by a slab of silicon, and wherein the highly doped regions are formed in the slab.

12. The electro-optic modulator of claim 8 and further comprising an input port waveguide coupled to a first side of the ring waveguide.

13. The electro-optic modulator of claim 12 and further comprising a second waveguide coupled to a second side of the ring waveguide.

14. The electro-optic modulator of claim 8 wherein the MOS diode comprises highly doped n regions on both an inside and outside of the ring waveguide.

* * * * *